US008066379B2

(12) United States Patent
Lalley et al.

(10) Patent No.: US 8,066,379 B2
(45) Date of Patent: Nov. 29, 2011

(54) INTERNAL PROJECTION SYSTEM FOR PROJECTING COHERENT LIGHT IMAGERY ONTO A THREE-DIMENSIONAL SURFACE

(76) Inventors: Marc Lalley, Franklin, NH (US); Matthew Lalley, Franklin, NH (US)

(*) Notice: Subject to any disclaimer, the term of this patent is extended or adjusted under 35 U.S.C. 154(b) by 354 days.

(21) Appl. No.: 12/246,945

(22) Filed: Oct. 7, 2008

(65) Prior Publication Data
US 2009/0027622 A1 Jan. 29, 2009

Related U.S. Application Data

(63) Continuation of application No. 11/799,508, filed on May 2, 2007.

(60) Provisional application No. 60/850,298, filed on Oct. 6, 2006.

(51) Int. Cl.
*G03B 21/00* (2006.01)

(52) U.S. Cl. ............. 353/10; 353/20; 353/122; 345/32; 359/451; 348/744

(58) Field of Classification Search .......... 353/20, 353/28, 122, 98, 74, 10, 121; 345/32; 359/741, 359/451; 348/744
See application file for complete search history.

(56) References Cited

U.S. PATENT DOCUMENTS

| 4,451,874 | A | 5/1984 | Friedman |
| 4,859,053 | A | 8/1989 | Nicolas |
| 5,546,139 | A | 8/1996 | Bacs, Jr. et al. |
| 5,907,312 | A * | 5/1999 | Sato et al. ............. 345/31 |
| 6,160,924 | A | 12/2000 | Lazar |
| 6,327,020 | B1 * | 12/2001 | Iwata ............. 352/69 |
| 6,409,351 | B1 | 6/2002 | Ligon |
| 6,499,846 | B1 * | 12/2002 | Hiller et al. ............. 353/50 |
| 6,644,816 | B1 | 11/2003 | Perra et al. |
| 6,698,900 | B1 | 3/2004 | Young et al. |
| 6,937,210 | B1 | 8/2005 | MacDonald |
| 7,352,340 | B2 | 4/2008 | Utt et al. |
| 2002/0067467 | A1 | 6/2002 | Dorval et al. |
| 2003/0189742 | A1 * | 10/2003 | Kobayashi ............. 359/202 |
| 2004/0130501 | A1 * | 7/2004 | Kondo et al. ............. 345/1.1 |
| 2004/0135977 | A1 | 7/2004 | Ito et al. |

(Continued)

FOREIGN PATENT DOCUMENTS

WO WO 00/28374 5/2000

OTHER PUBLICATIONS

"Acrylite®df Light Diffusing Acrylic Polymers," 2004, CYRO Industries, Parsippany, New Jersey, <http://www.cyro.com/Internet/SiteContent.nsf/LightDiffusing2004!OpenPage>.

(Continued)

*Primary Examiner* — Francis M Legasse, Jr.
(74) *Attorney, Agent, or Firm* — Intrinsic Law Corp

(57) ABSTRACT

A projection system that projects coherent light rays from a coherent light (e.g., laser) source onto an inner reflective surface of a three-dimensional viewing space is disclosed. A relatively compact and low-power laser light image can thereby be formed and seen by an observer from inside the viewing space. Raster scanning or simultaneous projection onto large solid angles of said viewing space are possible. Useful and entertaining information can also be displayed, optionally as dynamic and moving images, onto the projection screen as well.

33 Claims, 20 Drawing Sheets

U.S. PATENT DOCUMENTS

| | | | |
|---|---|---|---|
| 2004/0145709 | A1* | 7/2004 | Colucci et al. .................. 353/94 |
| 2004/0257539 | A1* | 12/2004 | Peterson et al. ................ 353/69 |
| 2005/0017924 | A1 | 1/2005 | Utt et al. |
| 2005/0214662 | A1 | 9/2005 | Kobayashi et al. |
| 2006/0262404 | A1 | 11/2006 | Victor et al. |
| 2009/0091710 | A1 | 4/2009 | Huebner |

OTHER PUBLICATIONS

"Digistar 3 Laser a Quantum Leap in Display Technology," (Date Unknown), Evans & Sutherland Computer Corporation, Salt Lake City, Utah, http:www.es.com/products/digital_theater/digistar3-laser.asp.

"Dome—Laser Projector Based on Laser Display Technology," 2003, Jenoptik LDT GmbH, Gera, Germany.

"Future with History," 2003, Jenoptik Jena, Jena, Germany, www.jenoptik-laserdisplay.com.

"Introduction of Software MacKiev's 3D Weather Globe & Atlas at Macworld San Francisco Exceeds Expectations," 2005, Custom Weather, San Francisco, California, http://www.customweathr.com/cw_news55.html.

"Laser Display Technology," Jenoptik LDT, Jena, Germany, (Date Unknown), http://www.jenoptik-laserdisplay.com/englisch/index_technology.htm.

Light Blue Optics Demonstrates Matchbox-Sized PVPro(TM) Projector Evaluation Kit, 2006, Advanced Imaging Pro Magazine, Cygnus Publishing, Ft. Atkinson, Wisconsin, http://www.advancedimagingpro.com/articie/article.jsp?id=2398.

"Light Blue Optics," 2006, Holdsworth Associates, Cambridge, United Kingdom, http://www.holdsworth-associates.co.uk/Light_Blue_Optics.162.0.html.

"Micro-Mini Video Projector," 2006, DaVinci Institute's Impact Lab, Louisville, Colorado, http://www.impactiab.com/modules.php?name=News&file=article&sid=7331.

"Nanotechnology for Full Colour Laser Television," 2000, Technisch Universitat Berlin, Berlin, Germany, http://sol.physik.tu-berline.de/htm_group/research/highpower/motivation.html.

"PVPro™ Enabling Personal Video Projectors," 2006, Light Blue Optics Ltd., Cambridge, United Kingdom, www.lightblueoptics.com.

"RGB & RYB Color," 2000, Passion Computers, http://www.compworks.faithweb.com/electronics/theory/light/rgbryb001.html.

Biehlig et al., "LaserCave—Some Building Blocks for Immersive Screens," 2004.

Cooley, "Battle of the 3D Globes," 2005, http://blog.deeje.tv/musings/2005/02/battle-of_the_3.html.

Deboer, "Laser Projectors Coming to Cell Phones and PDAs," 2006, Audioholics, LLC, New Port Richey, Florida, http://www.audioholics.com/news/editorials/laser-projectors-coming-to-cell-phones-and-PDAs/.

Fox, "Full Color Laser Television," 2000, Laser Vision Technologies, DOE Scientific & Technical Information, http://www.osti.gov/bridge/purl.cover.jsp?purl=/761030-VWlu6r/webviewable/761030.pdf.

Gainer et al., "A Full-Color, High-Resolution Laser Projector for a Flight Simulator Visual Display," 1993, EarthLink, Inc., Atlanta, Georgia, http://home.earthlink.net/~jcgainer/Resume/1proj.html.

Hollemann et al., "RGB Lasers for Laser Projection Displays," (Date Unknown) Laser F/X, Hamilton, Ontario, Canada, http://www.laserfx.com/Backstage.LaserFX.com/Systems/rgb-dpss.pdf.

Lindstrom, "Future Display Devices, Part 3: Laser Projection," 2000, Infocomm International, Fairfax, Virginia, http://www.infocomm.org/Newsnetwork/index.cfm?objectID=B9CCD0D0-CB08-11D4-A.

Murphy, "Laser Projection Equipment," 1993, International Laser Display Association, Orlando, Florida, http://www.laserist.org/ilda/glossary.shtml.

Piquepaille, "A Portable Holographic Projector," 2005, http://www.primidi.com/2005/01/02.html.

RGB Laser Projector, RGB Laser Projector LMG-RGBAOLP-02 Component Catalog, 2004, Light Management Group, http://www.1mgr.net/Products/RGB_C_Catalogue.htm.

Scott, "Video and Data Projection Systems," 2006, International Planetary Society, Inc., Amarillo, Texas, http://www.ips-planetarium.org/pubs/PDG/VideoData_Projection-F.pdf.

Travis et al., "Wedge-Shaped Screens for Flat Panel Projection Display," 2000, Cambridge University, Cambridge, United Kingdom, http://www2.eng.cam.ac.uk/~arlt1/wedge/Wedge.htm.

* cited by examiner

INTERNAL PROJECTION SYSTEM FOR PROJECTING COHERENT LIGHT IMAGERY ONTO A THREE-DIMENSIONAL SURFACE

RELATED APPLICATIONS

This application is a continuation of U.S. patent application Ser. No. 11/799,508, entitled "Three-Dimensional Internal Back-Projection System and Method for Using the Same," filed on May 2, 2007, which claims the benefit, under 35 U.S.C. §120, of U.S. Provisional Application Ser. No. 60/850,298, entitled "System and Method for Displaying Computer Controlled Laser Driven Coherent Images Over a Substantially Spherical or Other Three Dimensional Surface," to the present inventors, filed on Oct. 6, 2006, which are hereby incorporated by reference.

TECHNICAL FIELD

The present invention relates to a three-dimensional display system and method for using the same. More specifically, to a system and method for back-projection of coherent light images onto a three-dimensional surface defining a substantially-enclosed volume.

BACKGROUND

Humans generally find it useful or entertaining to view images or projections of visual representations of real or imaginary things. Therefore, technologies have been developed to enable us to place visual representations, such as still images and moving images, onto surfaces or screens so that we can enjoy or benefit from such visual displays.

One common depiction used for educational and recreational purposes is to depict the surface of planet Earth so that people can observe the various bodies of land and water thereon. Earth depictions can be in the form of photographs, illustrations, or other visual means. More realistic representations of Earth, the Moon, planets, anatomical structures, or other three-dimensional objects have been created by painting the image of the same onto a spherical or other three-dimensional shell or globe. The classic spinning globe atlas of Earth that can spin along a North-South axis is a standard feature in libraries, offices and homes. Medical institutions and instructional classrooms have benefited from drawn representations of anatomical features or organs (e.g., the brain) so that practitioners and students can get a clearer understanding of the structure of the organs. However, such representations usually are artists' drawn renditions, and may not have the desired or required level of detail. Also, such three-dimensional solid models lack a dynamic character that would allow the depiction of an image of an object in real time. In addition, it is difficult or impossible to selectively add or delete desired features or layers to such representations at will.

More realistic or dynamic representations of the surface of Earth have been used in products such as Google Earth from Google, Inc. of Mountain View, Calif. This product and others portray photographic images of the Earth onto computer monitor screens, giving the user the feeling of seeing the Earth from some height, either perpendicular to the terrain or at some angle thereto. However, the image is displayed on whatever display surface the user's computer monitor is using, which is generally flat or substantially two-dimensional. This is a general weakness in depicting naturally three-dimensional (e.g., spherical) objects onto flat, two-dimensional, projection surfaces.

Examples of visual projection display technologies include flat sheets of white or reflective material onto which an appropriate image is projected. These are commonly called "projection screens." This technique for illuminating a screen can be carried out on a suitable blank wall as well, and is the basis for common cinema projection displays, home slide show displays, outdoor wall displays, etc. The principle of operation of such displays is directing a focused image (still or moving) onto the projection screen or surface. The image is then reflected off the screen or surface so that it can be seen by observers on the same side of the projection screen plan as the device projecting the image onto the screen. Some drawbacks to this technology include that the projector device (e.g. movie or slide projector) and the screen are two distinct (usually large) pieces of equipment that require focusing and aiming of the projector onto the surface of the screen. Also, in such systems, as the projector and the viewing audience are on the same (illuminated) side of the projection screen the audience may be disposed between the projector and the projection screen. This requires special care so that the projector is not illuminating its audience from behind, and casting a shadow onto the projection screen, resulting in the well-known "down, in front!" complaint from the rest of the audience trying to enjoy the image. In these systems, the image can be said to be frontally projected onto the screen because the incident light from the projector device is reflected off of the frontal face of the projection screen, and both the projector (light source) and the viewer are on the same (frontal) side of the projection screen.

Another example of visual projection display technologies includes television sets and computer monitors and similar devices. Here, an image is projected from the "back" face of the screen and instead of being reflected off the screen, is scattered by the screen material and travels through the screen to the eye of the beholder. Such screens are illuminated through "back projection" by a projector or source of light that is on the opposite side or face of the screen than the viewers looking at the image on the screen. Therefore, these systems do not suffer from the viewer him or herself interfering with the path of light projected from the projector onto the screen.

Present back-projection systems typically project computer-controlled colored light onto a screen capable of scattering the projected light to form the image on the screen. Present systems require focusing and are generally projected onto flat surfaces or nearly flat surfaces, such as computer monitors or television screens. Some prior art includes back projection onto a non-flat screen, however, these prior systems suffered from limited clarity and focusing problems because the light used by their projectors was not coherent. Also, these prior systems lacked a true range to cover a substantial three-dimensional projection screen because of the cumbersome mechanisms that had to be installed on the side of the screen facing the projector, thereby limiting the solid angle that could be displayed on the projection screens of traditional back projection systems. Also, prior systems were generally incapable of producing dynamic images and more complex and interesting or useful images, and in many case were only capable of providing static or quasi-static images on the screens. In addition: presently available coherent light projection systems generally only scan a coherent light source over the projection surface, and don't include appropriate modulation components for the applications discussed below. In addition, present systems can require excessive power and cooling mechanisms that are not practical desirable, or possible in the applications as discussed below.

Some present systems purport to project images onto a convex mirror that is mounted inside of a projection screen, the mirror being in a predetermined position facing the projector. This approach fails to achieve a proper focus over the extended projection screen due to the varying image distance in relation to the screen and the convex mirror geometry. Also, in existing systems of this type, the size of the screen cannot be changed without adjusting the mirror and the optics, which is not possible and/or not practical or cost effective. Also, the solid angle that could be displayed on the projection screen is limited by the mirror, which casts a distracting shadow that detracts from the projected image.

Other present systems require the use of custom optics to achieve a variable focal distance to attempt to match the corresponding distance from the image projector to the three-dimensional screen. This method displays images in fair focus at closer range, eliminating the shadow. However, numerous limitations of this type of projection system have not been overcome. For example, it is not possible to substantially cover a spherical or other substantially enclosed three-dimensional screen with a clear true focused image using this system. Furthermore, when alterations are made to the screen size, distance, or shape, corresponding custom alterations would also be required to be made to the lens in order to function properly. Such custom lens design is not available and/or not practical or cost effective, therefore, these systems cannot satisfy a need for a variable-focal length projection coverage of a three-dimensional screen.

The systems described above typically employ a conventional non-coherent light source such as a UHP lamp. Conventional non-coherent projector systems require collocation of their incident light beams to form a clear, sharp, focused image onto the projection surface, and a focused image is generally formed in one plane at a given distance from the projector.

Other existing systems project light into an expensive and cumbersome inflatable balloon by means of a fiber optic tether, which carries light and power to a scanning deflector module and projection head. Limitations of this system include its undesirable size, cost, safety concerns, reliability, and efficiency. These systems use mixed gas lasers which deliver very high amounts of laser energy in the visible spectrum. As a result they require a very high electrical power input and a commensurate cooling capability to prevent overheating. These systems also require a three-phase power supply, 220 volt circuit running on a 45 A breaker per phase. This system also has a very high discharge current and is extremely costly to own and maintain.

The cost to own a ion laser is tens of thousands of dollars annually. Mixed gas lasers also emit a very large amount of heat requiring a continuous water supply for cooling. By combining water and high voltage together in the same unit, a mixed gas ion laser puts the user at great risk of electrical shock.

This system is also very bulky, needing roughly 9.5 cubic feet of space and weighing over 200 lbs. Ion Laser tubes contain Beryllium Oxide, which is carcinogenic if ingested or inhaled, so extreme care must be taken when handling this type of device.

These types of lasers are currently used in commercial laser light shows, and are the preferred laser types for such displays due to the high output. In a large scale multimedia display such as a stadium, great care must be taken to ensure the safety of the observers. The inner workings of the system must be off limits to people unless properly trained to handle such equipment.

There is a need for a three-dimensional back-projection display system that can overcome inter alia, the limitations of the prior art by eliminating focal difficulties, cumbersome mirror assemblies, custom optics requirements, costly and impractical light source cooling, and distracting shadows cast onto the display surface.

SUMMARY

Various embodiments of the present invention are directed to an image projection system having a coherent light source configured to emit coherent light in a visible portion of the electromagnetic spectrum; a microdisplay array that receives the coherent light from said coherent light source and provides a controlled coherent light output representing an image; an optical lens assembly that operates on the coherent light output of said microdisplay array and delivers a corresponding coherent light output for projection onto a projection screen; a projection screen having a three-dimensional configuration substantially defining an enclosure volume through which the coherent light output from the optical lens assembly travels to be incident upon an inner surface of said screen; wherein said projection screen is constituted to have an inner surface, an outer surface, and a composition therebetween; and wherein said projection screen and said composition are configured and arranged to receive the coherent light output from said optical lens assembly and to present a corresponding viewable image that is observable from outside the enclosure volume.

Other embodiments are directed to a method for projecting an image onto an interior surface of a projection screen, including the steps of generating coherent light in a visible portion of the electromagnetic spectrum from a coherent light source; providing said coherent light as an input to a microdisplay apparatus; controlling said microdisplay apparatus to achieve a coherent light representation of the image as an output of said microdisplay apparatus; providing said output of said microdisplay apparatus as a coherent light input to an optical lens assembly disposed substantially within an internal volume at least partially defined by said projection screen; and affecting the coherent light input of the optical lens assembly within the optical lens assembly so as to project a coherent light output from said optical lens assembly outward from the optical lens assembly and onto the interior surface of the projection screen to form a visible image viewable from outside the projection screen.

DETAILED DESCRIPTION

Figure 1:
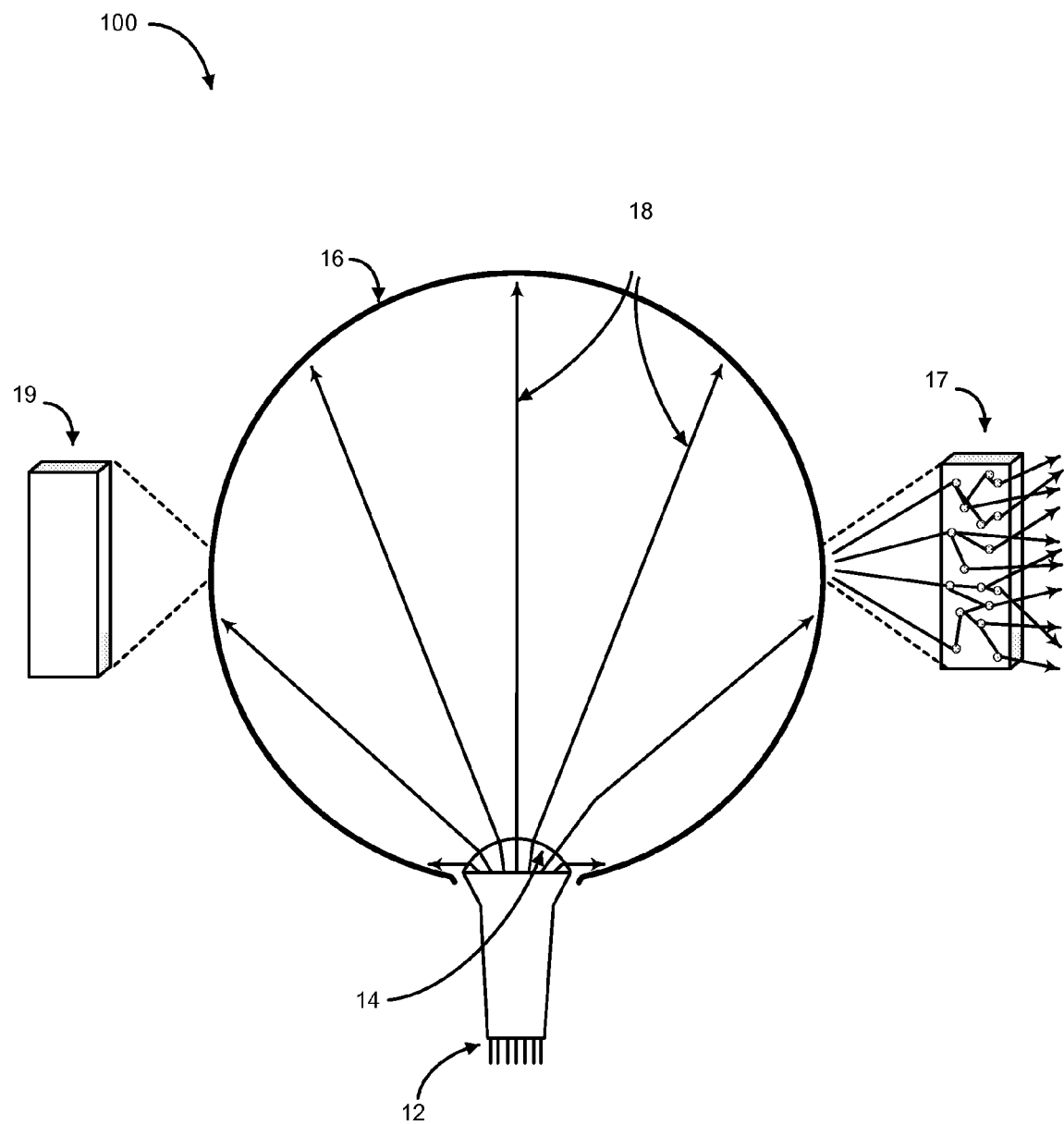
FIG. 1 illustrates an exemplary representation of a cross-section of a three-dimensional internal back-projection shell with exemplary ray paths and functional depictions of the interior and exterior compositions of said shell.

As discussed above, it can be useful to project onto or illuminate a three dimensional projection surface so that it displays a visual image that is either static or moving. Present systems are not able to effectively project such images to substantially cover a spherical projection surface due to focusing, distortion, interference, and other limitations.

The present disclosure describes novel projection systems and methods for operating the same that place coherent light from a rear projection source onto an interior surface of a substantially-enclosed three-dimensional non-opaque projection surface such as a sphere. The projection surface diffuses, scatters, or passes the light projected onto its interior surface so that a viewer observing the outer surface of the spherical projection screen may observe the projected images. The images may be projected from a projection apparatus coupled to an apparatus for processing and storing still or live images, or the images may be downloaded from another storage source or an image sensor such as a still or animated camera. The images may further be transmitted from a source to a destination over a network such as a LAN or a WAN or the Internet itself.

The systems described and claimed herein do not suffer from the problems associated with conventional three dimensional image projection systems in part because they employ a coherent light projection apparatus instead of a conventional non-coherent light projection apparatus (e.g., UHP, lamp, arc lamp, incandescent, light emitting diode "LED"). Conventional non-coherent projectors require collocation of their incident light beams to form a clear, sharp (focused) image onto the projection surface, and a focused image is generally only formed in one plane at a given distance from the projector. This fact limits conventional non-coherent projectors to projecting a focused image onto a substantially planar, or flat, projection surface. By contrast, coherent light sources form a sharp image that can remain clear and focused (while focusing is not required) at essentially any distance from the source of coherent light. Therefore, when combined with a wide angle lens greater than 90 degrees, coherent light projectors can form a clear and sharp image resulting in greater than hemispherical coverage on a substantially spherical substantially-enclosed projection screen. Coherent light projectors are also capable of providing a higher resolution image with greater color gamut, lower power consumption, and longer life expectancy than conventional non-coherent image projectors are capable of.

Some embodiments of the present invention use at least one vertical cavity surface emitting laser (VCSEL), or an optically or electrically pumped vertical extended cavity surface emitting diode laser (VECSEL) capable of emitting highly collimated coherent light, illuminating a microdisplay. Laser light is much more directional than non coherent light, providing more luminescence and less beam scatter than other types of light. Lasers are a common source of coherent light, and are typically XvYCC compliant, capable of displaying the substantial range of colors viewable by the human eye. By illuminating, a microdisplay with a VCSEL or VECSEL laser light source, an ultra high definition, full color, coherent image is formed witch retains the properties of coherent light, having a great depth of focus. This allows for fewer and cheaper optical components in the display system than in a system that doesn't use coherent light sources. In some embodiments, low-power laser light sources are employed to generate the coherent light, with the low-power laser light sources being compact enough and consuming little enough energy so as not to require active cooling of the laser light sources. In some embodiments the low-power laser light sources require less than about 1 Watt (W) of energy during operation. In other embodiments, the low-power laser light sources require less than about 0.25 W of energy during operation.

The present system can include components for adjusting the coherence of the coherent light used. An in-line coherence adjustment element may be used to reduce speckle in the projected image in case of excessive speckle that may result from interference of coherent wavefronts that are subject to phase or intensity fluctuations. One example of such an element for controlling the diffusion of the coherent light is a diffusion filter that can be placed in-line with the light rays' path.

The optics are configured to project the image over a solid angle of roughly equal to or greater than 180 degrees to achieve substantially spherical coverage over the internal surface of the globe projection shell. It is possible in some embodiments to employ lenses that spread the incident coherent light out over a solid angle of almost 360 degrees by using the right lens. This proves very useful when projecting into certain asymmetrical shapes. By positioning the optics toward any side of a substantially closed projection shell facing inward, complete focused coverage minus the optics is achieved, filling any substantially closed projection shell, regardless of size or symmetry. Without the use of custom optics and cumbersome mirrors. Efficiency and safety are substantially increased, while creating a truly modular screen system with no shadows.

The present systems are primarily intended to produce visible intelligible images representing real or abstract objects. The images may be of colored or monochromatic nature. Colored light produces corresponding color images with respective characteristic wavelength content. Light wavelengths are representative of oscillations in the electromagnetic energy which is known to run a range of wavelengths in "the electromagnetic spectrum." Light of different colors generally includes characteristic wavelengths corresponding to the different colors, with violet and blue colors having shorter wavelengths (and higher electromagnetic field oscillation frequencies) than orange and red colors, which have longer characteristic wavelengths (and lower electromagnetic field oscillation frequencies). In that regard, the present system includes the ability to produce and project visible light. Visible light is light having characteristic wavelengths (and combinations thereof) in the visible portion of the electromagnetic spectrum, and includes light with wavelengths between about 380 nm and 780 nm, and even between about 400 nm and 700 nm.

A VCSEL is a type of semiconductor laser diode with a laser beam emission generally and substantially exiting the device perpendicular from the top surface. Work on VCSELs began in the late 1970s and VCS EL devices are used in optical fiber data transmission applications. A VECSEL is a small semiconductor laser similar to a VCSEL. Unlike a VCSEL, in which two highly-reflecting mirrors are incorporated into the laser structure to form the optical cavity. In a VECSEL, a partially reflective mirror is added outside of the chip, but still inside the pump laser housing to further intensify the beam. VECSELs do not require external cooling and can run on 5 watts of power for two hours using 4 AA cells. A ultra high performance ("UHP") lamp requires an external fan and uses significantly more power than a comparable VECSEL source. In some embodiments, the present invention uses a VECSEL coherent light source to generate the coherent projected image.

VECSEL devices can provide almost 100% light output for 20,000 hours compared to a mixed gas ion laser which has a 2,000-5,000 hr tube life, and a UHP lamp which has roughly a 2,000 hour life span. So the replacement of these components is both frequent and costly. Replacement tubes for ion lasers cost about $8,000 to $10,000, and a replacement arc lamp costs about $500. VECSELs are also "instant on" sources, meaning when the laser is turned on, the light output is substantially instantly available at full power.

Additionally, VECSEL sources can be mass produced more easily than other types of sources, so they can be produced more economically than other sources. VECSELs are manufactured in a monolithic array format, allowing for low cost power scaling, speckle reduction and redundancy. All components are wafer produced and fully tested at wafer level, and they are line assembled with easy tolerances. Cost is much less than a mixed gas ion laser, and can be produced cheaper than UHP lamps at a rate of over one million laser array chips per year. A state of the art GaAs wafer fabrication facility can produce several million VECSEL array chips per year. A VESCEL array chip can emit very bright, highly collimated, polarized, coherent light providing very high contrast for diffractive, reflective or transmissive microdisplays such as Liquid Crystal On Silicon ("LCOS"), Liquid Crystal Display ("LCD"), Digital Light Processor ("DLP"), and grating light valve ("GLV"), while eliminating the need for costly polarizing filters.

While most present projection screens and surfaces are flat or substantially planar, it can be useful to project images onto spherical or other three dimensional projection screens. For example, there is potential educational, utilitarian, and entertainment value in having dynamic images projected from within onto a substantially spherical or other three dimensional projection screen through a wide angle lens. In one instance, images of the Earth's surface could be projected by the coherent source onto the interior surface of a spherical projection screen. The Earth, or other celestial bodies such as stars, planets, moons, or others are generally substantially spherical in shape. Therefore, projecting an image of the surface of these bodies onto the interior surface of a spherical screen in a way that allows a viewer looking at the exterior surface of the screen to see the image provides a more accurate view of the object being examined than if it was projected onto a flat surface.

A map projection of the earth designed so that a straight line from the central point of the map to any other point gives the shortest distance between the two points is generally referred to as an azimuthal equidistant projection. This enables a single flat map to represent distances and directions on the Earth's surface. This type of map projection is used in navigational and defense purposes.

In using a substantially spherical or three-dimensional projection surface for projecting an image of the Earth, the present "globe" projection surface allows layering of other visible data onto the Earth image. For example, the layered images can display and label various active forces such as global warming, plate tectonics, weather, demographic, political, economic, and other data. Historical data can also be displayed such as past and current country, state, and political boundaries, time zones, grid and vector data, and famous voyages. The system thereby can provide both temporal as well as spatially dynamic displays of information for educational, utilitarian, or entertainment purposes. The system can additionally be constructed to display color animated light shows to digital music and educational tutorials describing in more detail any science associated with the globe.

FIG. 1 illustrates an exemplary embodiment of a back-projection system 100 that includes a coherent light projector with near complete spherical coverage, and specifically about or greater coverage than 180 degrees. The projection surface in internal back-projection systems is intended to be non-opaque so that a viewer can see an image on the projection surface obtained by light traveling through the projection surface. That is, the observer stands outside projection screen 16 and observes what comes out of the backlit projection screen. In this case, a spherical projection screen 16 is used to portray an image of an object such as the Earth's surface. An incident laser (or coherent) light image 12 is projected or emitted onto the incidence (input) side of a convex 180 degree wide angle lens, commonly called a "fisheye lens" 14. Lens 14 refracts the beams from incident image 12 to spread the beams 18 in a way that they are incident onto and cover the entire interior surface of the spherical projection screen 16. The spherical projection screen 16 will be described in more detail below.

In some embodiments, lens 14 is a glass, quartz, or other optical material that is adapted to carry and light beams in the visible range of the electromagnetic spectrum (visible light). Lens 14 may be a single lens or a compound set of lenses designed to provide the effect of a wide angle lens that spreads incident light beams outward onto the interior surface of screen 16. Lens 14 may be equipped with coatings and imbued with optical or chemical additives to enhance its performance in spreading the incident light 12 and redirecting it as 18. A simple example lens 14 has a back (input, or incidence) side that receives as input an incident laser image 12 that is generated by a laser projector below the lens (not shown) or that arrives at the lens 14 by way of other lenses, mirrors, or optical components. The incident image 12 can be a static image or a dynamic moving image (e.g., a video stream). The convex shape of lens 14 causes the individual light beams therein to deflect from their original direction and are redirected according to the size of the lens 14, its shape, curvature, composition, and wavelength of the light in incident image 12. The fish-eye lens 14 can be a semi-spherical section or derivation thereof, including a 180-degree lens that can deliver light to substantially a 360-degree region of the interior surface 17 of spherical projection screen 16.

It is noted that projection screen 16 includes an inner portion along an interior thickness of the screen that has scattering elements to cause scattering of light incident of the interior surface 17 of screen 16. The scattering may result from the purposeful inclusion of scattering particles such as beads, bubbles, dust, glitter, shavings, fibers, and the like. The scattering may also be provided by a coating or other mechanical or chemical treatment of the interior surface 17 of projection screen 16. Frosting can also be used to scatter incident light beams from the interior surface 17 of screen 16 so that the beams are redirected in a plurality of directions. After passing through the scattering interior portion of projection screen 16, the light passes through the light-permissive exterior portion 19 of the screen 16. This can be accomplished by using common glass, acrylic, crystal, or other transparent or substantially transparent layers on the outside surface 19 of screen 16. It is possible to construct a projection screen 16 to suit the present inventions where the entire thickness of the screen includes frosted or scattering elements as described with regard to the interior surface 17 portion above. That is, the material of screen 16 does not necessarily need to be constructed from layered or graded material, but can also be constructed from uniform scattering material. Finally, the scattering material, treatment, frosting as discussed above may be disposed at or near the exterior surface 19 of projection screen 16.

In some embodiments, the screen is formed from a glass, polymer material, plastic, acrylic, or the like and is provided with micro-beads within the material. The micro-beads have optical properties such as a selected index of refraction, or range of indices of refraction, that causes the light rays incident on the screen's interior surface to diffuse within the screen before being sent out the screen's outer surface. In other embodiments, the interior surface, of the screen is mechanically, chemically, or otherwise treated or coated to cause it to have a surface texture that diffuses the incident light. For example, the interior surface of the screen can be scratched, rubbed, knurled, dimpled, or have raised microscopic features that scatter and diffuse the incoming light for better viewing at a variety of angles. The interior projection surface can also be coated or laminated with a second or multiple layers that provide desired optical properties to the screen. The exterior surface of the screen 16 can be smooth, or coated or textured to reduce glare and enhance the viewing contrast and overall aesthetic experience.

Image distortion, sometimes referred to as the "barrel distortion" can occur with wide angle lenses in general, and is addressed by the present invention. A cause of the distortion is that, ordinarily, the incoming image 12 is typically formed for use with a flat projection screen like that of a television or a computer monitor instead of a curved, spherical or three-dimensional screen. When the image is spread out as shown by beams 18 of FIG. 1, the edges and center of the image undergo a spatial transformation that deflects the light beams from their original configuration in the undistorted image 12. Therefore, to form an accurate image on screen 16, the incoming image 12 can be pre-distorted in an inverse or complementary way such that when the image undergoes distortion through lens 14 and arrives at screen 16 the pre-distortion and the distortion from lens 14 cancel each other's effects and provide an accurate image on the interior surface 17 of screen 16. Pre-distortion can be accomplished by processors configured for use with the lens 14/shell 16 combination, and may be programmable to work with a variety of such combinations and to allow for major or minor adjustment by service technicians or end users.

According to embodiments of the present invention, the screen body is contoured into three dimensions rather than a conventional flat (generally two-dimensional) screen. In some examples, this provides substantial or extreme curvature of some or all portions of the projection screen such as to form a substantially spherical or similar highly curved surface onto which the internally back-projected image can be displayed. The formation of the screen can be done in several ways, including by molding, bending, blowing, forming, extruding, or otherwise processing sheet material to form the body of the screen 16. The screen 16 has an inner surface 17 that faces the projection source and an outer surface 19 that the viewer beholds when viewing the projected image. The screen is designed with optical properties that permit it to be back-lit (from the inside) so that light can pass from its inner surface 17 outward to its outer surface 19 and beyond. However, the screen is not completely transparent so that the viewer does not become distracted with the inner components of the projection system and so that the projected images are properly visible and diffused by the screen. Therefore, for viewing at a range of angles, the projection screen can be designed to scatter and diffuse the incident light arriving at its interior surface, which will send light corresponding to the incident light at any given spot on the screen into multiple directions, including substantially all directions, including especially substantially all directions outside projection screen 16.

In one exemplary embodiment, the present invention provides a fully interactive digital back-projection of the surface of a planet (e.g., Earth) on a globe-shaped projection surface, where the globe displays some or all aspects of movement (e.g., rotation) associated with the Earth. Other aspects such as Earth's atmosphere can also be depicted thereon. Azimuthal equidistant images of Earth are provided from a computer-readable source by way of a computer to a microdisplay which is illuminated by a coherent light source. The microdisplay and the computer can be directly or indirectly coupled to achieve the imaging desired at the microdisplay. The system creates a coherent visible signal or image to be sent through an optical element with roughly a 180 degree field of view (FOV). The optical element is mounted at an outer edge of a substantially spherical projection shell, as described above, and sending the coherent visible signal or image towards an internal surface of the projection shell which enables an observer looking at an outer surface of the projection shell to see the visible signal or image.

The three-dimensional projection screen or shell can be formed from glass, polymer material, plastic, acrylic, or the like. The interior surface of the shell can be mechanically, chemically, or otherwise treated or coated to cause it to have a surface texture that diffuses or scatters the coherent light. The shell can be scratched rubbed knurled dimpled or have light diffusing or scattering polymers that scatter and diffuse the incoming coherent light for better viewing at a variety of angles. The interior projection surface can also be coated or laminated with a second or multiple layers that provide desired optical properties to the shell. The exterior of the shell can be smooth, coated, or textured to reduce glare and enhance the viewing contrast. The shell can be custom tinted to enhance the overall viewing experience.

In some embodiments, the system also comprises a housing or case which acts as a decorative enclosure internally housing and protecting various optical and electrical components that provide computational functions or the output of audio and coherent visual data. The housing can further comprise a manifold for power distribution and electrical surge protection, and an air circulation system for the removal of excess heat generated by the various electrical components. The housing also provides a surface for mounting connections to streaming data, standard electrical service, a user interface, and the input and output of audio. This can be done in the form of an mp3 "dock." In some instances, the housing supports the projection shell and completes the globe's physical dimensions.

Figure 2:
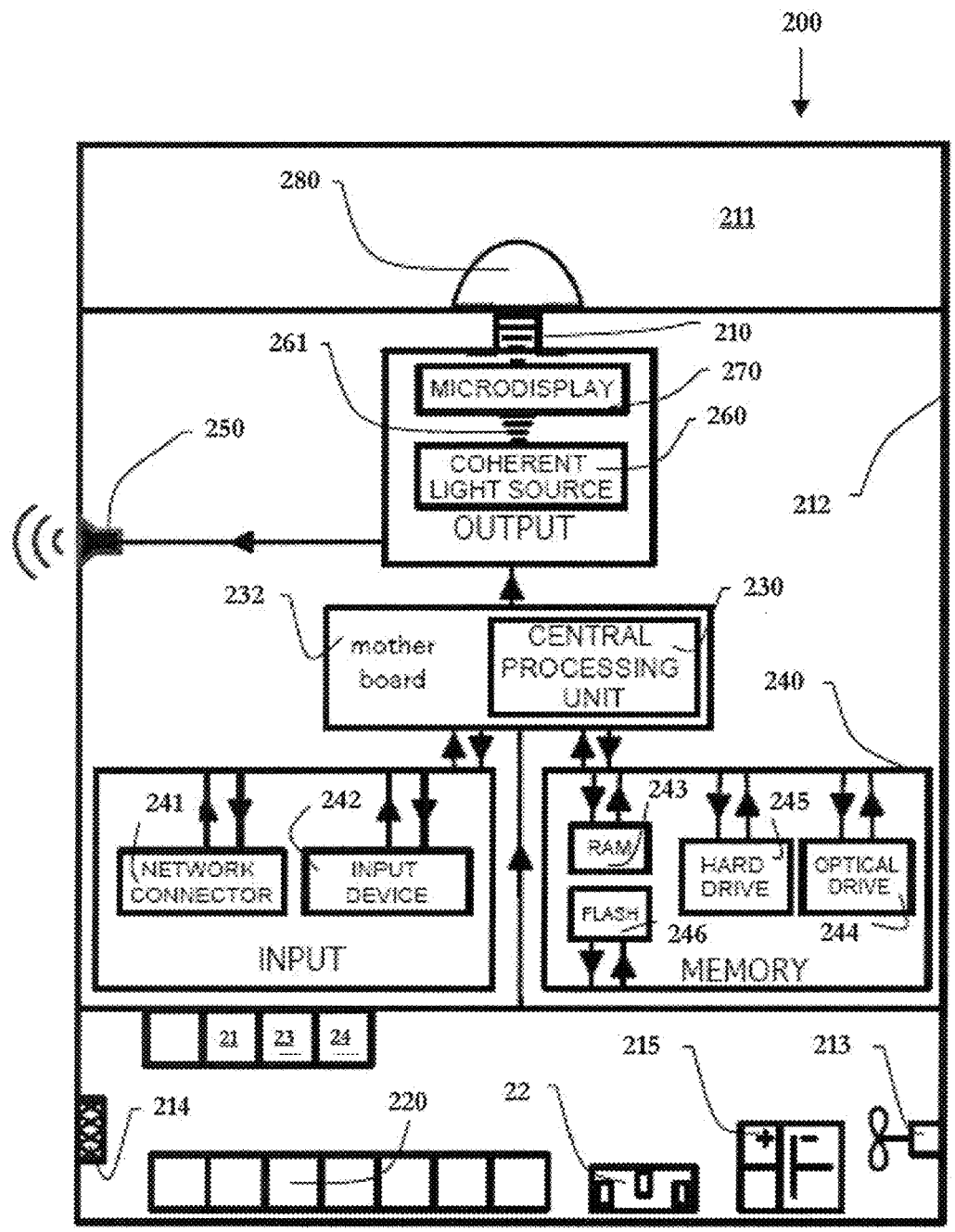
FIG. 2 is an exemplary block diagram showing the interconnection of a set of components of an illustrative coherent light projection system.

FIG. 2 illustrates an exemplary schematic diagram of a system 200 for projecting a coherent light image onto a three-dimensional screen. Generally, one or more storage devices are coupled to a memory module and are adapted for storing and releasing selected image or multimedia digital information such as digital images (JPG, GIF, TIFF, PICT, . . . ), digital films (MPEG, AVI, MOV, Podcast, . . . ), sound files (MP3, WAV, FLAC, . . . ), and data relating to the system. These memory modules are coupled to a processing unit adapted for operatively controlling an output to the coherent light source and/or a microdisplay that delivers a coherent light image to a projection screen through a wide-angle lens as discussed above. In some embodiments the system is intended to produce images of celestial bodies, e.g. the Earth, and the files stored include images and films or animations or simulation results depicting the Earth.

Projection system 200 delivers coherent images 210 to for display on a three-dimensional projection surface that substantially encloses or defines an internal volume 211. The three-dimensional (e.g., partial sphere) projection surface is coupled to a housing 212 which houses and protects various electrical and mechanical components of the system 200 as well as the output of audio and coherent visual data. The housing 212 also provides a surface for mounting connections to streaming data 21, standard electrical service 22, a user interface connection 23, and an input and output of audio connection 24. The housing 212 further provides a surface for mounting a cooling fan 213, an air circulation vent 214, a battery 215 or other source of electrical power, and a manifold for power distribution 220.

Projection system 200 also includes one or more apparatus for processing electronic data, instructions, or signals. For example a processor 230 which receives power from another portion of the system and includes connections for electrical power, and cooling means. The processor 230 controls most or all logical operations of the present system, and is typically disposed on a printed circuit board or other type of suitable motherboard 232. The functions of processor 230 are myriad, some of which are described in greater detail elsewhere with respect to image processing and other numerical and logical operations used to properly project a coherent light image onto the present three-dimensional screens. The processor can perform operations on the information and data it receives and provides an output that corresponds to signals to be sent to form the projected image and/or sound from the system. One type of operation performed by processor 230 is the pre-distortion mentioned above to compensate for geometric (e.g., "pincushion") distortion from the lens projecting onto the projection surface. Other processing operations known to those skilled in the art include for example format conversion, amplification, decompression, decoding, and other signal processing operations.

Other components coupled (directly or indirectly) to motherboard 232 include memory apparatus 240, network connection apparatus 241, and input apparatus 242. The memory apparatus 240 provide the processor 230 with access to instructions and data stored on memory apparatus 240. The memory apparatus 240 can be in the form of random access memory (RAM) 243 which takes the form of integrated circuits that allow the stored data to be accessed in essentially any (random) order without physical or mechanical movement of the storage medium. An optical drive 244 which can read and write data on optical disks. A hard drive 245, which is a permanent storage device used to hold data. Flash memory 246 which is a form of non-volatile computer memory held on memory cards that can be electrically erased and reprogrammed.

The network connection apparatus 241 is used to provide a link to a wide area network ("WAN") via the Internet or satellite transmissions or other means of communicating with remote systems over a wired or wireless network. The present system 200 and the components thereof can use a variety of connectors and protocols for carrying data and signals thereover, including TCP/IP with Ethernet connectors, USB connections, Firewire IEEE connections, WiFi 802.11, Bluetooth, and others being known or becoming available.

The input device 242 gives the user the ability to control the input and output of visual and audio data to the system 200. Examples of input devices 242 include, but are not limited to, integrated touch-screen, mouse, keyboard, track ball, track pad, joystick, click wheel, and remote control etc. Further examples of user interface devices are given elsewhere in this document and are known or will become known to those skilled in the art. In general, content is selected for display on the three-dimensional projection surface by a user through input device 242.

Processor 230 sends data received from the memory 240, with or without processing the data, to at least one optional audio speaker for generation of sound to accompany the coherent projected images. Output from processor 230 is a coherent light source 260, a microdisplay 270, an optical element such as a wide angle lens or array of lenses 280 as discussed elsewhere.

The coherent light source 260 directs colored light (e.g., red, green, and blue coherent light) 261 toward microdisplay 270. By illuminating the microdisplay 270 with coherent light, a full color high definition coherent image 210 is formed. The coherent image 210 is directed toward optical element or assembly 280, which consists of shaped pieces of transparent material with opposing surfaces that are contoured to allow the coherent image 210 to subtend an output projection angle. This angle can substantially cover the three-dimensional projection surface, and may be roughly equal to, equal to, or greater than 180 degrees to give almost or substantially 360-degree coverage in some embodiments. The three-dimensional projection surface can consist of any substantially enclosed three-dimensional space large enough to accept the optical lens element or assembly 280.

A coherent image which leaves the microdisplay 270 is directed towards an optical lens element 280. It is worth describing some basic types of lenses or lens components that can be used as part of lens element or assembly 280 in various present embodiments. The power of a lens is measured in millimeters and is known as the focal length. The focal length is the distance between the focal plane and the optical center of the lens. In addition, there are generally two types of wide angle lenses: short-focus lenses and retrofocus lenses, which can individually or in combination with other optical elements be used to construct an appropriate lens assembly 280 for the present purposes.

A fisheye lens is a type of lens that has a wide field of view, including some having a very wide field of view covering a broad solid angle. Fisheye lens angles of roughly 180 degrees can also produce what is known as "barrel distortion," where the image magnification decreases with increasing distance from the optical axis. In the context of photography, fisheye lenses which can cover or capture substantially hemispherical views may produce this type of distortion as a result of a hemispherical scene being projected onto a two-dimensional photographic medium such as film. This tends to give the image of objects with straight lines that do not radiate out from the center point of the photograph a warped appearance, while leaving lines which do radiate out from the center straight or less distorted. In some or all embodiments of the present invention, this type of lens is suitable for projecting azimuthal equidistant images as is discussed in more detail elsewhere in this document. Note that equivalent optical apparatus, whether analog or digital, and whether electronic or mechanical, or combinations thereof, that accomplish the same or substantially the same function as lens assembly 280 are comprehended by the present disclosure and associated claims.

Microdisplay 270 is a display having compact physical proportions, as suitable for the application at hand. For the present applications, a microdisplay typically has a screen size less than about 5 diagonal inches, and even less than two diagonal inches, or even less than 1.5 diagonal inches, but these dimensions are not intended to be limiting of the present description or other embodiments that are and will be apparent to those skilled in the art. The precise action of the microdisplay 270 is to control the coherent light delivered to the lens element or assembly 280. This same or equivalent function is accomplished using "light valves" or "light modulators" as known to those skilled in the art. Three specific examples of types of microdisplays 270 suitable for some or all present embodiments include "reflective" microdisplays and "transmissive" microdisplays, and "diffractive" microdisplays, depending on the specific embodiment and application under consideration.

The use of a coherent light source in the present context allows for the system to operate with a small-sized microdisplay, which is able to be made smaller than what would be required if the light source was non-coherent (e.g., ARC lamp). The small microdisplay can be addressed electrically or optically to achieve its function.

In some embodiments of the present system, the coherent light source's output covers a cross-sectional area substantially equal to, slightly larger than, or slightly smaller than the area of the microdisplay.

In other embodiments, a lens system or an array or collection of specially-selected (e.g., magnification, de-magnification) lens components or optical elements is disposed between the optical source and the microdisplay so as to more evenly distribute the coherent light from the light source onto the surface of the microdisplay. In some specific embodiments, this may provide a substantially uniform light intensity across a substantial (e.g., one half or more) fraction of the microdisplay's surface area. In yet other embodiments, an optical element, such as a diffractive element, is placed in-line with the output of the light source so as to further concentrate or intensify the light incident upon the microdisplay.

Still other embodiments hereof employ a scanning apparatus disposed between the source of coherent light and the microdisplay so as to cause a scanning of the coherent light onto the surface of the microdisplay. In particular examples, the scanning is done in a raster or Cartesian or x-y grid pattern as determined by the scanning apparatus.

As mentioned above, the projection system 200 can be coupled to external sources of information over a network. Examples of such sources of information include image repositories (including still and moving images) or a live camera feed, or a national, local, regional or global weather system, economic market data sources, sensors, including environmental and biometric sensors, satellite camera sources, aerial camera sources, traffic systems, libraries, or other sources in order to receive information, for display on the contoured surface. The data can be controlled to display current (real time) information or historical information (past times) or predicted information (future times).

Processor 230 can be a part of a computer system, such as a personal computer ("PC") or workstation, and may in fact be a PC or a modified PC as needed, and may be implemented ill a central processing unit ("CPU"), graphics processor, or other processing unit suitable for this purpose. Processor 230 can also receive inputs in various embodiments from control devices, including a user interface control pad, which allows a user to control the system, including controlling the images projected onto the projection screen.

User interactivity can be accomplished locally or remotely by using at least one input device. Input devices are sometimes referred to as input or user interface peripherals. A peripheral is added to the terminal computer in order to expand its abilities. The term "peripheral" is sometimes applied to devices that are connected to the system externally, typically through some form of computer bus connection, or communicate with the host wirelessly. However, the user input device 242 can be physically mounted to the housing 212 and can be hardwired or integrated with the underlying computer. Examples include touch screens and multi touch screens and others as described herein.

Figure 3:
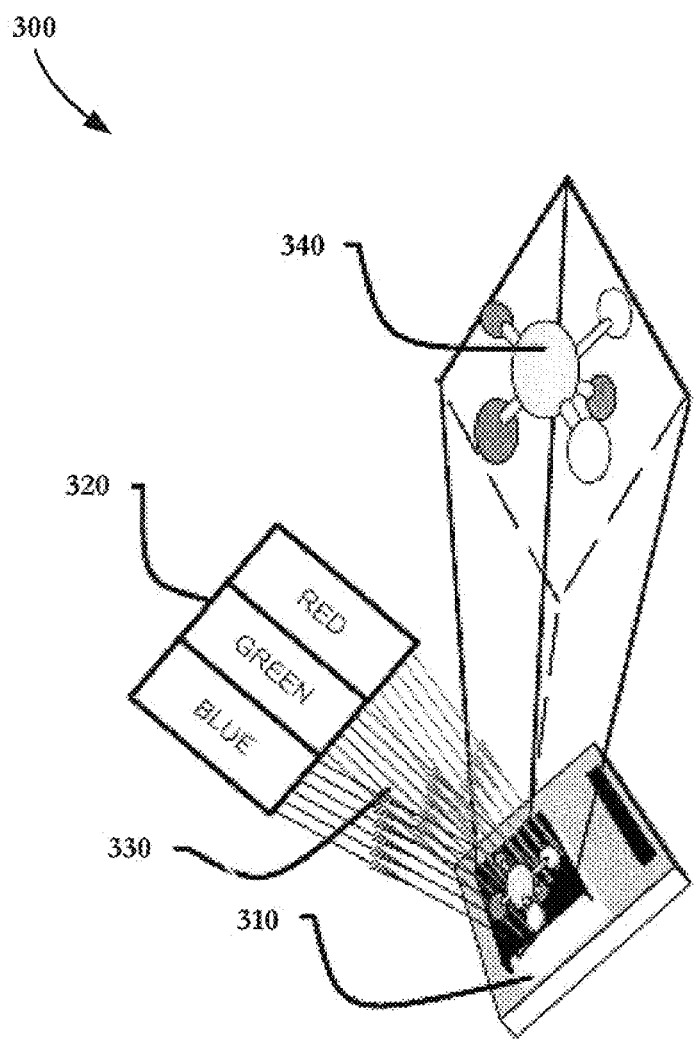
FIG. 3 illustrates the use of a microdisplay module for reflection of a coherent light signal in the present system.

FIG. 3 illustrates an exemplary reflective microdisplay 310 that selectably reflects light off a micro image array. Examples of reflective microdisplays include LCoS, GLV, and DLP microdisplays. A Grating Light Valve (GLV) is a reflective digital micro-electro-mechanical system ("MEMS") technology in which parts of the device are physically moved to alter the path of light shining on the device's surface. Pixels in a GLV reflect light from the surface in their "off" state, while in their "on" state, they diffract light from the surface. A coherent light source 320 directs red, green and blue stimulated coherent light and projects coherent light rays 330 towards microdisplay 310, which are then scattered, diffracted, or reflected by the face of microdisplay 310 as a full color coherent image 340 while substantially maintaining the properties of the reflected coherent light 330. A "DLP" microdisplay is a reflective MEMS display made from silicon or other similar material, and is composed of an array of tiny mirror elements. Each pixel mirror can be controlled independently by voltages and can be "flipped" from one orientation to another. This feature allows light to be switched into or out of the optical path. A "LCoS" microdisplay is a hybrid technology using elements from silicon wafer processing and liquid crystal manufacturing. It is a reflective display which uses liquid crystals instead of individual mirrors. Liquid crystals are applied directly to the surface of a silicon chip which is coated with a highly reflective aluminized layer. These microdisplays can be operated as one or more microdisplay panels.

Figure 4:
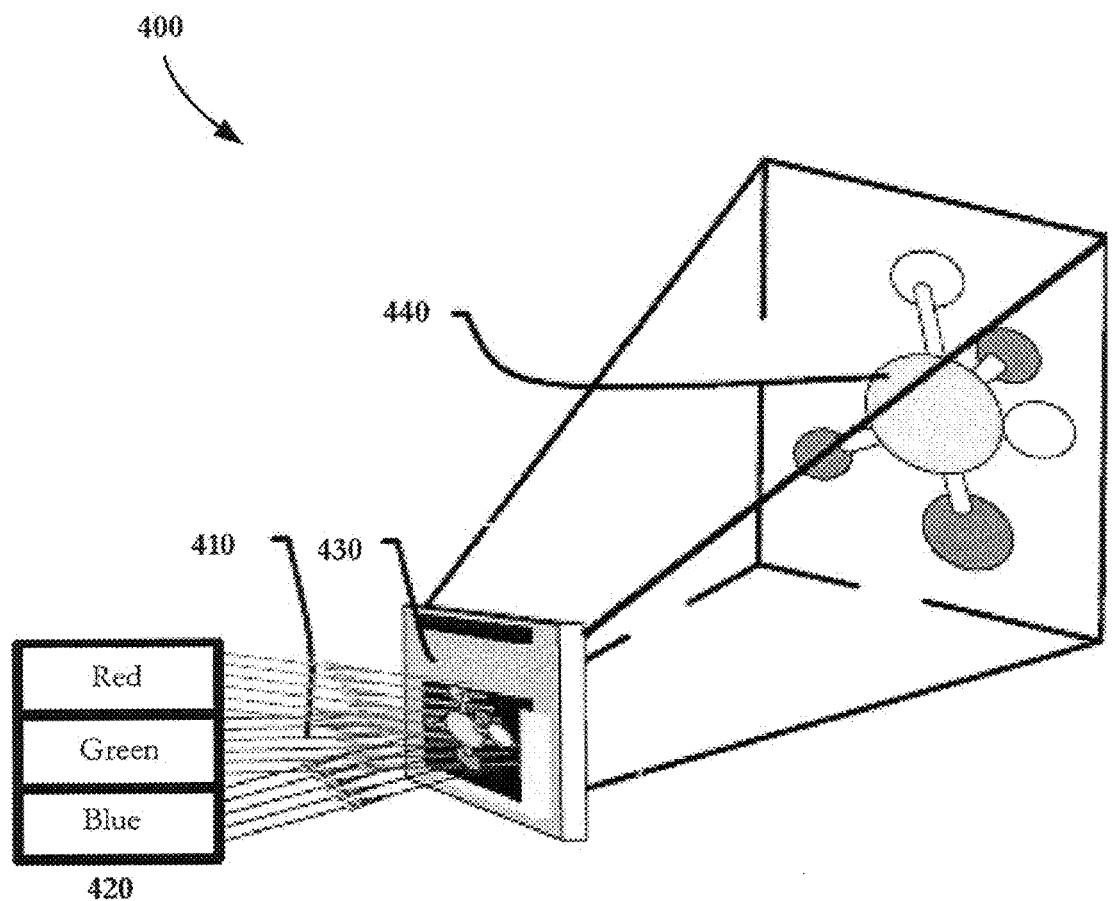
FIG. 4 illustrates the use of a microdisplay module for transmissive modulation of a coherent light signal in the present system.

FIG. 4 illustrates an exemplary transmissive micro display 400 that selectably allows coherent light 410 to pass through it. The coherent light source 420 directs red, green and blue stimulated coherent light at the transmissive microdisplay 430. The light is then passed through the transmissive microdisplay 430 as a full color coherent image 440 while maintaining the properties of coherent light. Microdisplays can also be operated with a single or with multiple microdisplay panels. A "HTPS" microdisplay is a transmissive liquid crystal microdisplay that changes the light passing through each pixel with control voltages.

Figure 5:
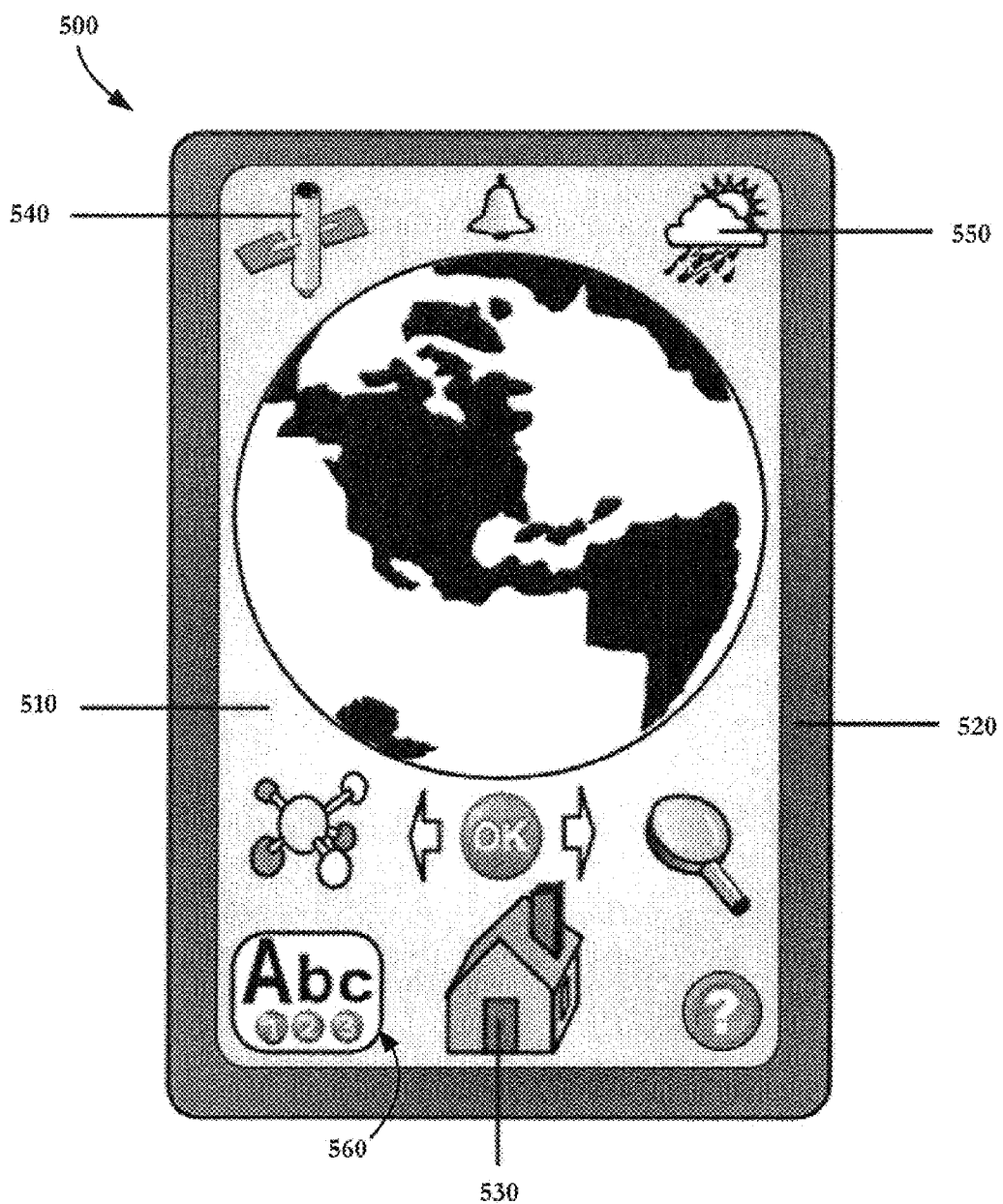
FIG. 5 illustrates an exemplary user interface for interacting with the present projection system.

FIG. 5 illustrates an exemplary design of a hand held computing multi-touch input device 500 for use with the present invention for the purpose of displaying an image of planet Earth and associated information. In one variation of this design, an interface screen or control pad 510 is mechanically coupled to the system's housing 520. The system's housing 520 houses and protects computing devices which the interface screen 510 interacts with. The control pad 510 has the ability to display icons on its surface such as a "home" icon 530, "satellite" icon 540, or a "weather" icon 550. These icons and others 560 take a user command by touching or pressing them with the user's finger or a stylus or a wand. Special backing beneath control pad 510 can react to pressure or electrical or magnetic signals from a user's hand, stylus or wand or other input apparatus to activate a location on a grid corresponding to a particular function of the user interface of the multi-touch input device 500.

In some embodiments, a user can use actuation controls on the control pad 510 to control the orientation of a projected image on the contoured projection surface. In one embodiment, the control pad 510 includes special hardware for use by the user. In another embodiment, the control pad includes software for controlling the system. In still other embodiments, control pad 510 includes both hardware and software for controlling the system. The control pad 510 can also be used by software designed with the system to correct or adjust the image by adjusting for distortion, contrast, brightness, color, sound volume, etc.

Control pad 510 ca also be used to perform functions such as turning the system on and off. Also it can be used to control which data is selected for display on the projection screen and in what form. For example the interface is used for turning on or off various data layers shown with a display of the Earth (e.g. cloud cover).

A grid overlaid onto the globe may be included in the projected image or added thereto for example to represent the latitude and longitude lines on the surface of the Earth. The control pad 510 can also be used with software to pan (translate) the image or zoom (magnify) in or out of a selected location on the surface of the globe. The user can thereby navigate to a location on the globe and control the appearance of the image on the projection screen.

Figure 6:
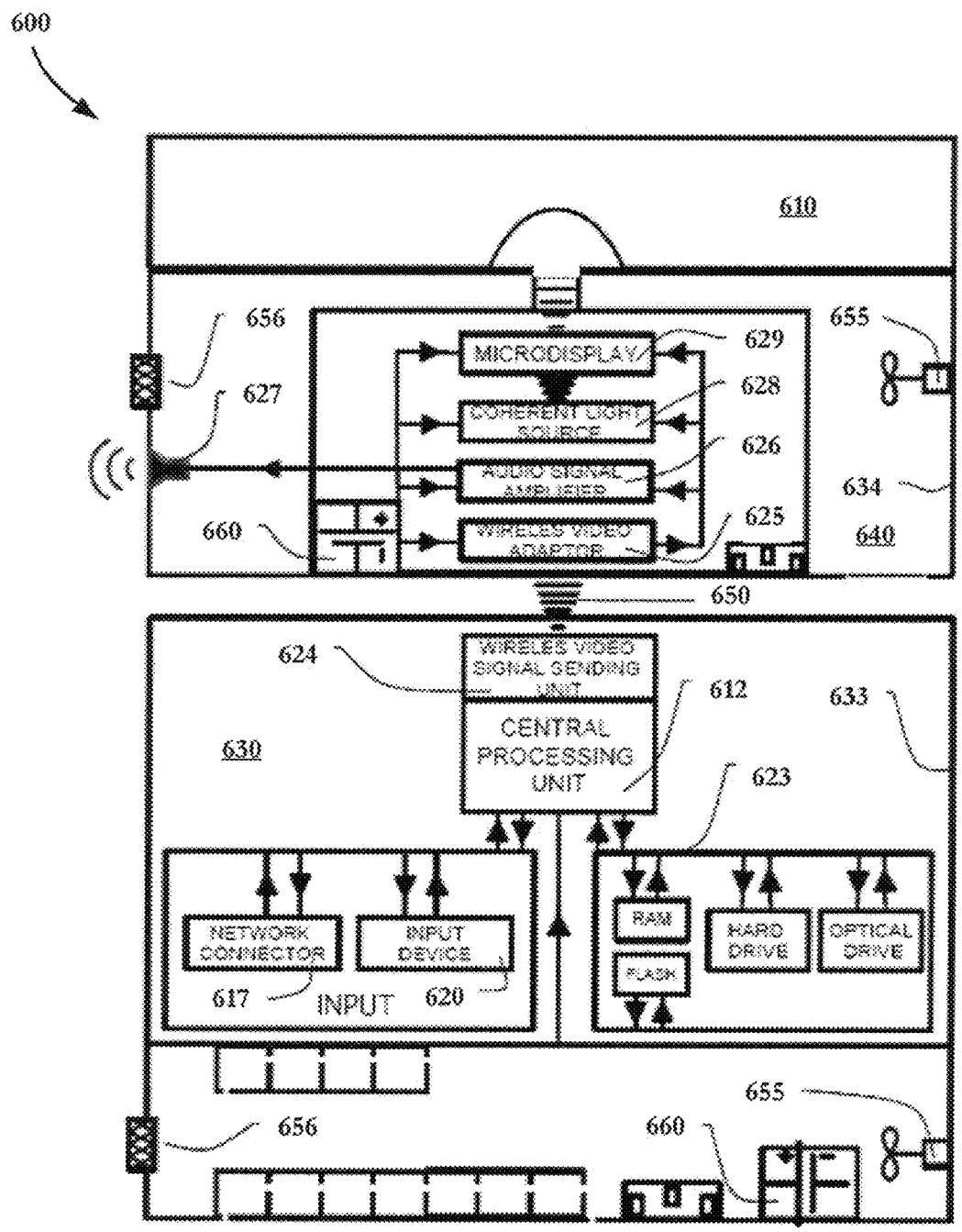
FIG. 6 is an exemplary block diagram showing the interconnection of a set of components of another illustrative coherent light projection system with wireless communication capability.

FIG. 6 illustrates another exemplary embodiment of the major components of a computerized three dimensional media projection system 600. Content is selected for display on the three dimensional projection screen 610 by a user through an input device 620. Here, processor or CPU 612 sends data received from the memory 623 to a wireless video signal sending unit 624 which sends a wireless signal 650 to be compatible with a wireless video adaptor 625. This allows the CPU 612 to wirelessly stream audio and video at a high rate to an audio signal amplifier 626, a coherent light source 628, and a microdisplay 629. The audio signal amplifier 626 amplifies low power audio signals to a level suitable for driving at least one loudspeaker 627. This separates the main computing components 630 with the main output components 640. The main computing components 630 are housed and protected by a housing 633. Similarly, the main output components 640 are protected by a housing 634, which may be common with housing 633. The housings 633, 634 further provide a surface for mounting one or more cooling fans 655, and one or more air circulation vents 656, as needed. The housings 633, 634, can further provide a surface for mounting one or more batteries 660. In one embodiment, the main computing components 630 can be hand-held with an integrated flat display screen configured to receive touch, multi-touch instructions as discussed above. A network connector 617 can be configured to receive streaming data from wireless networks such as cellular and WiFi 802.11 making the system highly portable.

Figure 7:
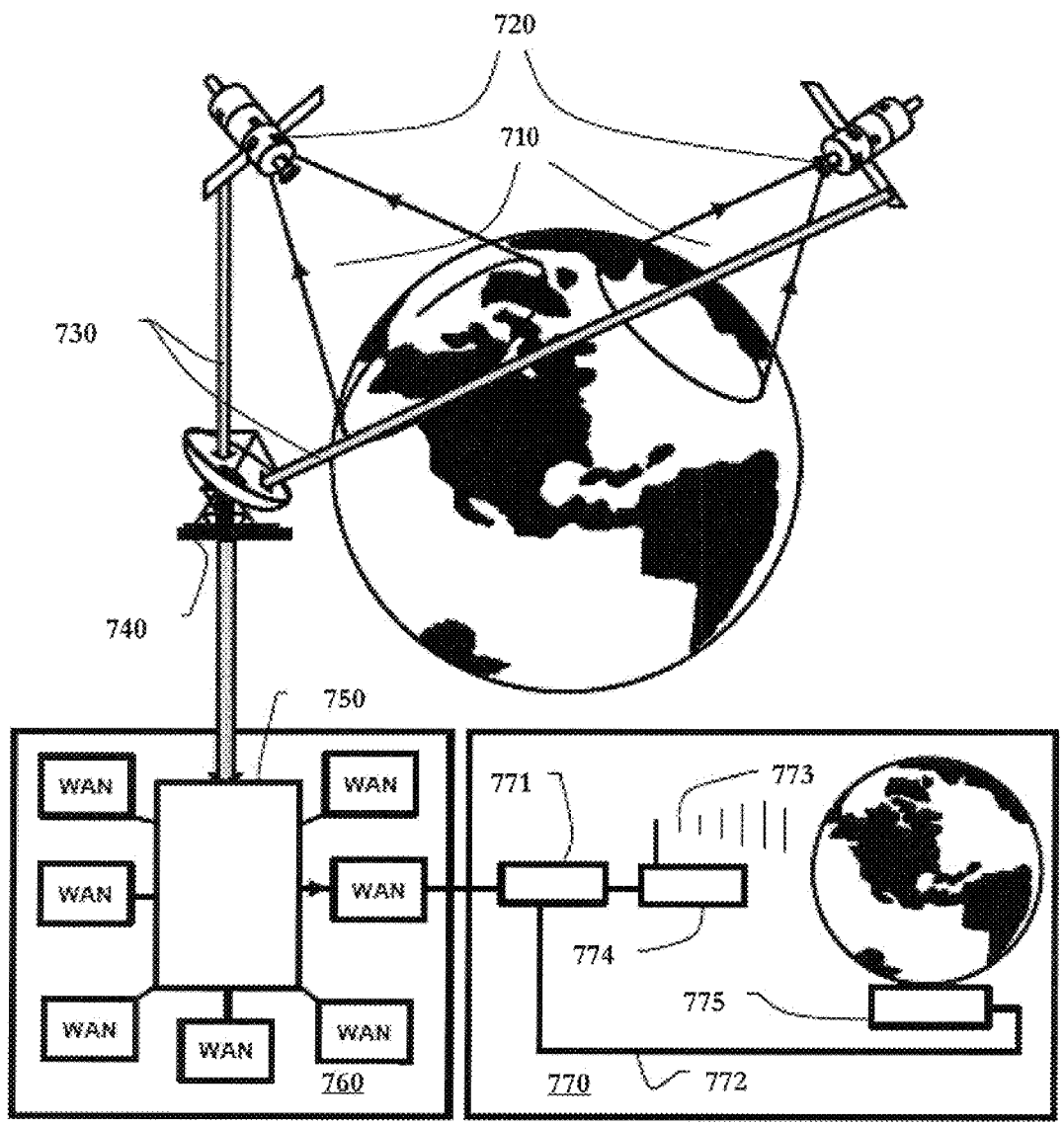
FIG. 7 illustrates an exemplary arrangement of components for capture and transmission of images and data for use in the present projection system.

FIG. 7 conceptually illustrates how images of Earth are gathered and delivered over a network to a projection device of the present invention substantially in real time. Images of Earth 710 are taken by video and or camera equipment mounted to satellites 720 in orbit. The image data 730 is received by a satellite dish 740 which is located on the ground. This data is compiled and provided to a dedicated host computer 750 which is coupled to a wide area network 760. Wide area network 760 can be a secure network and may be in a star configuration in some embodiments. The data is then retrieved by a personal area network (PAN) 770. A modulator-demodulator device ("modem") 771 produces a signal that can be transmitted easily and decoded to reproduce the original data. Data can then be transferred to the globe projector 775 by a cable 772, or wirelessly 773 through a wireless router 774. The components which make up the PAN can be directly integrated into the globe during manufacturing.

Figure 8:
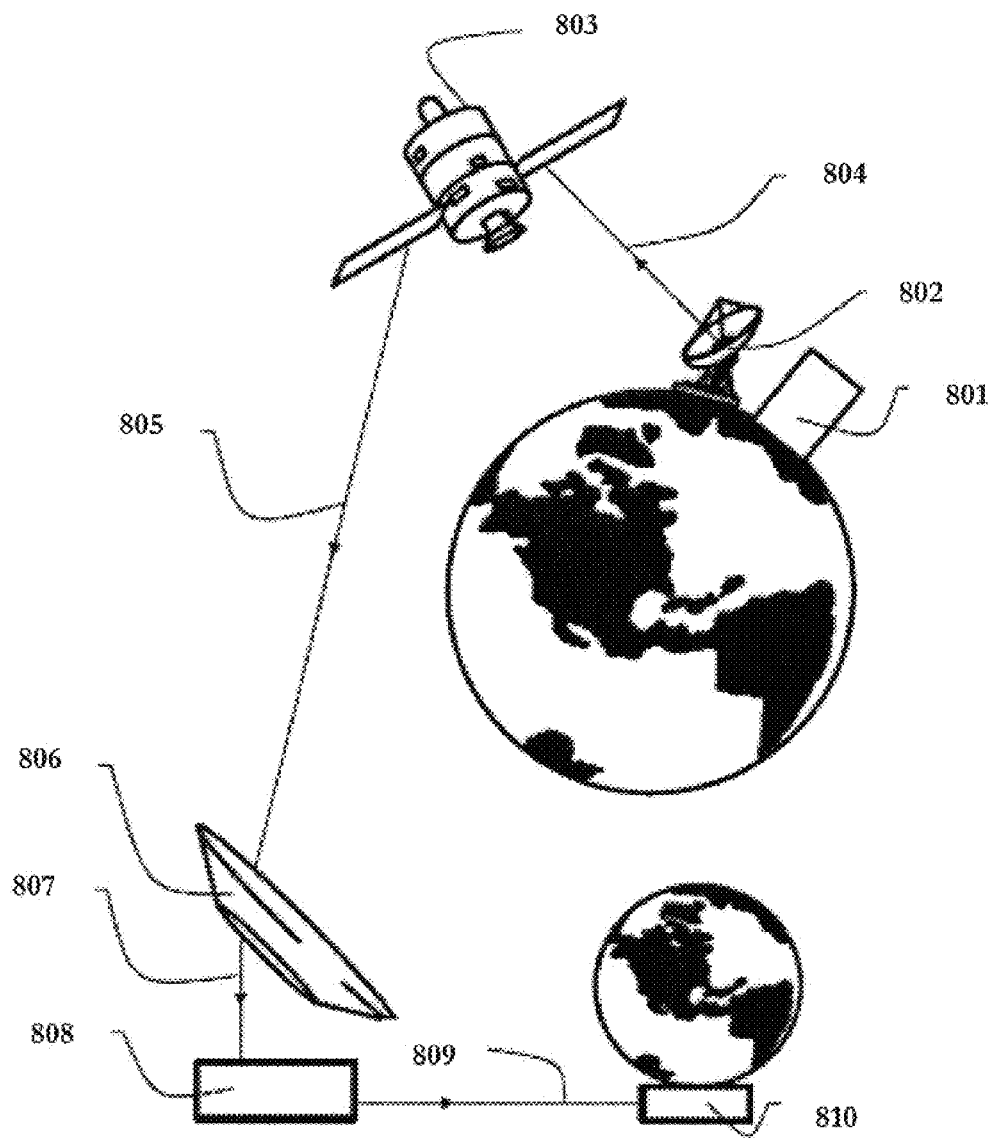
FIG. 8 illustrates an exemplary arrangement of components for transmission of data for use in the present projection system.

FIG. 8 conceptually illustrates how data can be transferred to and between components of the present invention substantially in real time. The remote terminal computer 801 sends information to a satellite dish 802 coupled to the remote terminal computer 801. The information 804 is then sent to a satellite or satellites 803 by the satellite dish 802 where it is redirected 805 toward the ground. A second satellite dish 806 then sends the data 807 to a receiver 808 which in turn provides the information 809 to the globe projector 810 through a network connection as discussed above.

Figure 9:
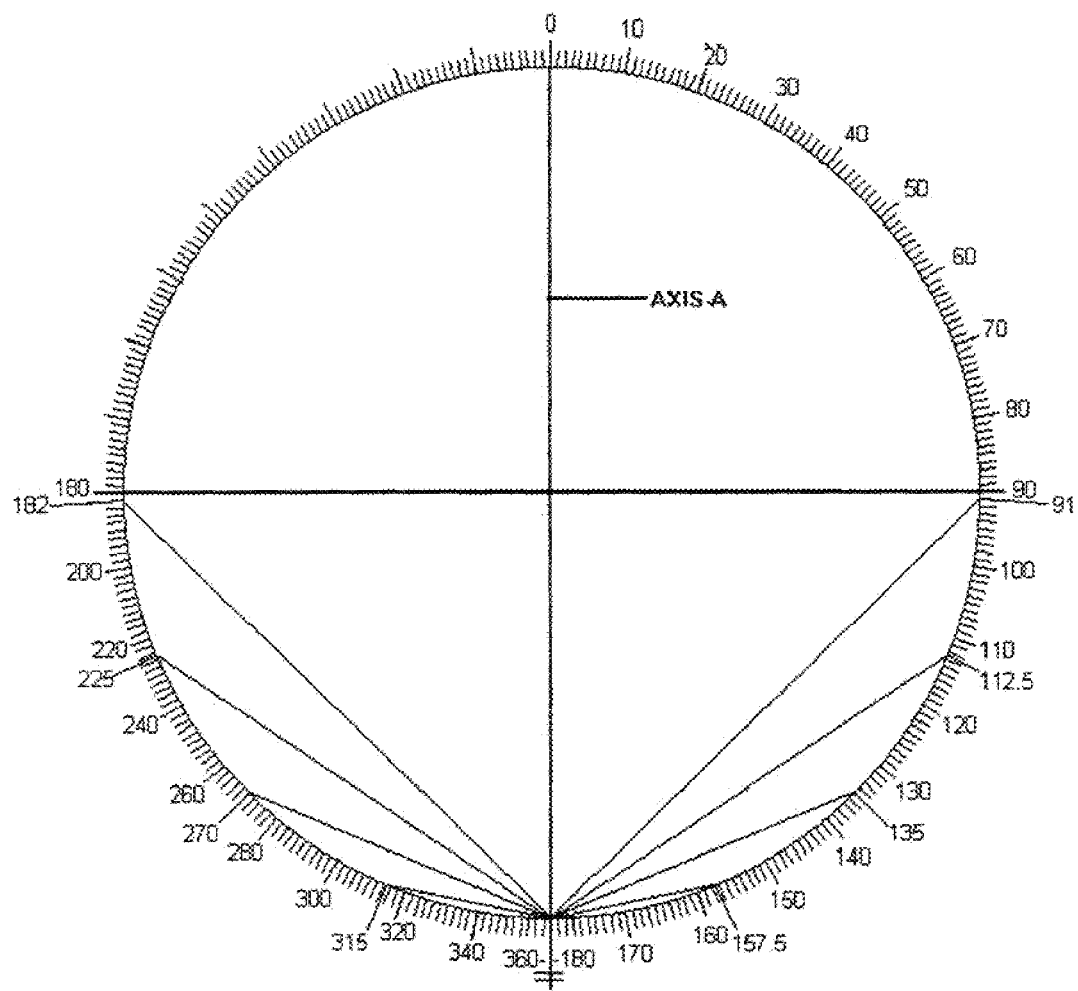
FIG. 9 shows illustrative ray paths from an exemplary wide angle projection lens.
Figure 10:
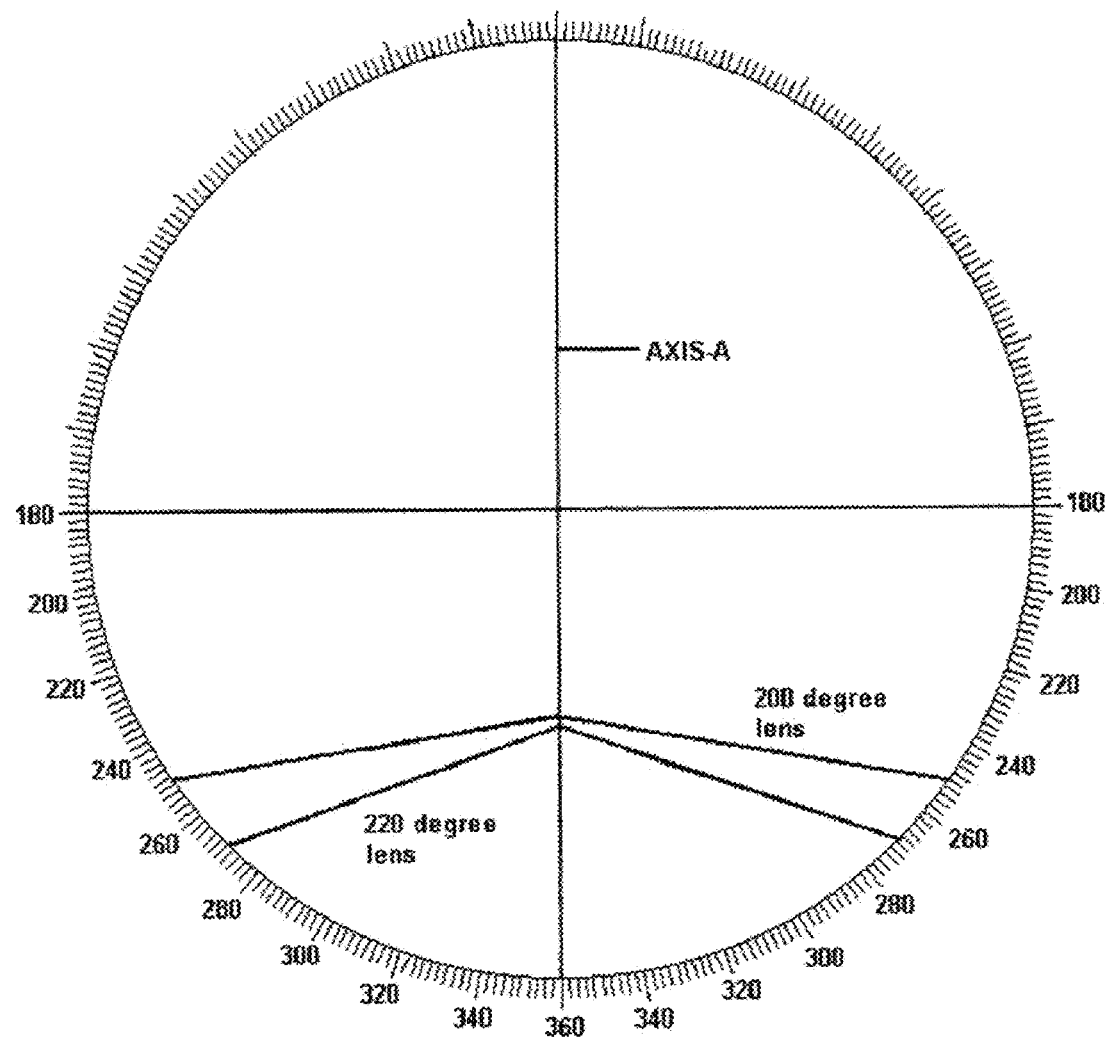
FIG. 10 shows illustrative ray paths covering greater than hemispherical coverage of the inside of a sphere.

FIGS. 9 and 10 illustrate the coverage obtainable by use of various exemplary lenses or lens assemblies for spreading an incident coherent image out onto the interior surface of a substantially spherical projection shell.

Referring to FIG. 9, the numbers on the right side of the chart represent wide angle lenses with a field of view output measured in degrees. The numbers on the left side of the chart represent greater than hemispherical coverage achieved by these lenses. For example, a lens with an output angle of 112.5 degrees can cover 225 degrees of the interior projection surface solid angle, when the lens is mounted where axis (A) meets the outer edge of the chart marked 360 degrees. This number is achieved by multiplying the number by two, or by transferring the value 112.5 directly across the chart to the value of 225 degrees. However, the 112.5 degree lens can be mounted along axis (A) in such a position to provide up to 292.5 degrees of spherical section coverage. This is determined by adding the value of 180 to the lens output in degrees. Therefore, 292.5 degrees is approximately the maximum spherical section coverage that can be achieved using a 112.5 degree lens when mounted along axis (A) in this simple embodiment. This method can be used to outline the greater than hemispherical coverage of any lens output angle up to 180 degrees.

Referring to FIG. 10, two examples of lenses greater than 180 degrees are shown by way of illustrating the solid angle spherical section coverage achieved by the present invention in the case of a spherical projection surface with a wide angle lens located about its southern pole. Here, both examples (200 and 220 degree lenses) have approximately full range of a hemispherical section of greater than 180 degrees and somewhat less than 360 degrees, as limited by the lens aperture when positioned along axis (A) giving substantially the same greater than hemispherical coverage of a 180 degree lens. In addition, when projected into a three-dimensional screen, such as an anatomical brain-shaped screen, because a portion of the light is reflected at a downward angle, greater coverage is obtainable, and a more realistic image is projected onto the screen as will be discussed below.

Figure 11:
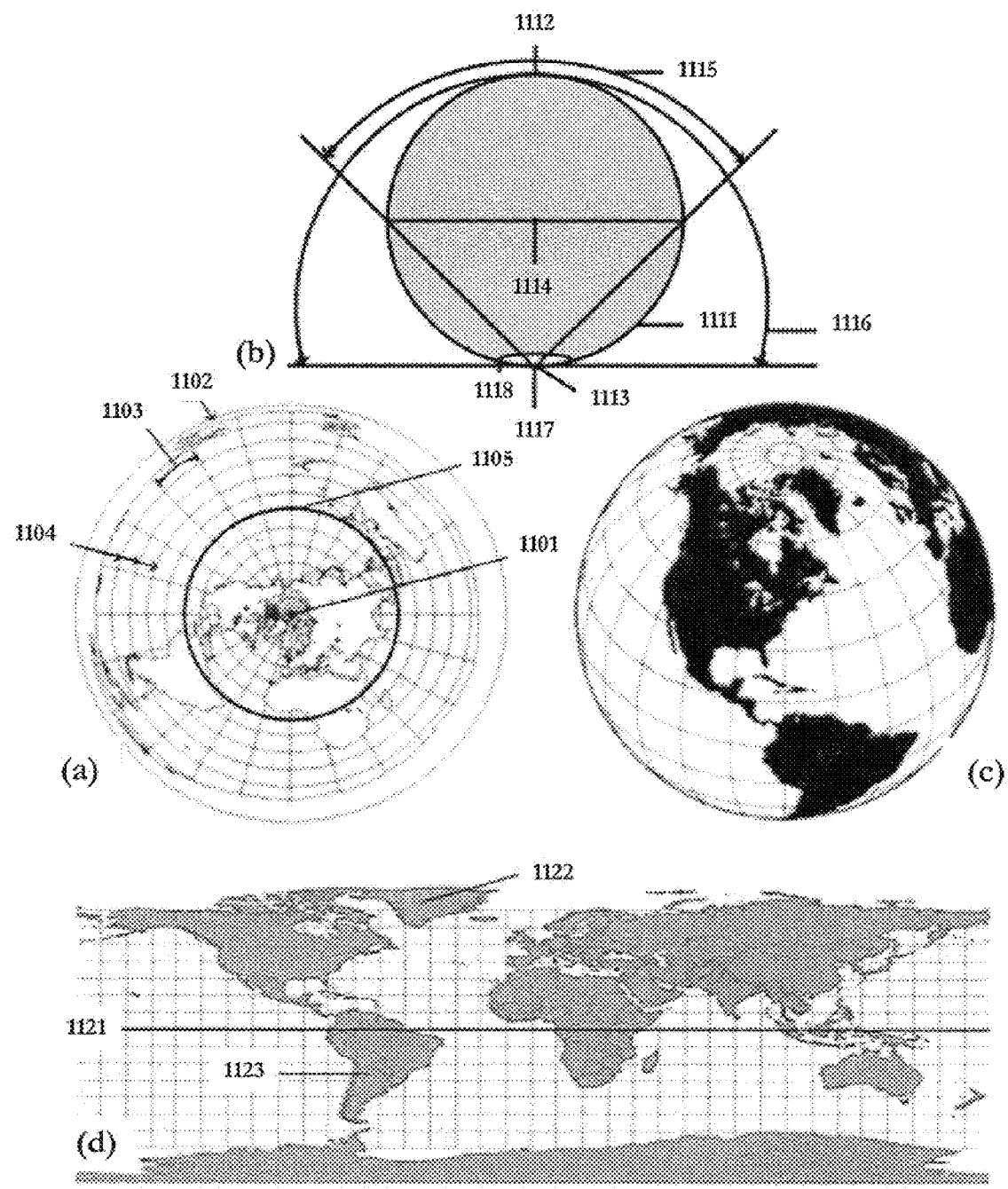
FIG. 11 illustrates the use of azimuthal equidistant projections for projecting a substantially spherical object image onto the present projection surfaces.

FIG. 11 illustrates the utility of using azimuthal equidistant projections of a spherical object similar to the shape of planet Earth, which are suitable for use with the present invention. FIG. 11 (a) shows an azimuthal equidistant image of Earth with its center point 1101 representing the North Pole, and its outer diameter 1102 representing the South Pole. The lines of longitude 1103 radiate out from the center, and the lines of latitude 1104 are equally spaced from one another. The distance between the lines of longitude 1103 on the azimuthal equidistant grid steadily increase radiating out from the center point 1101, the lines of latitude 1104 are spaced equally from one another, and the equator 1105 divides the image in half. The result is a fair representation of the Earth when projected into a sphere as seen in FIG. 11 (c). This is what the coherent light image projected onto the interior surface of a spherical projection screen would appear like to a viewer seeing the projection screen from the outside. The example illustrated in FIG. 11 delivers the inner half of the azimuthal equidistant image to the northern hemisphere of the globe, and the outer half of the image to the southern hemisphere of the globe.

Referring to FIG. 11(b), when an azimuthal equidistant image similar to that of FIG. 11 (a) is projected into a sphere 1111, the North Pole 1112 is the farthest distance from the lens 1113. Points of interest further down the sphere 1111 from the North Pole 1112 are nearer to the lens 1113. The distance from the surface of the sphere 1111 to the lens 1113 steadily decreases, until contact is made with the aperture 1114. In this example, the angle 1115 covered by lens 1113 corresponds to a 90-degree angle, and is therefore the inner half of the total 180-degree projected angle 1116. The outside limits of this angle fall on the equator 1114. Corrective software can be further used to place the South Pole at true south 1117 in respect to sphere 1111, aperture 1118, and lens 1113. Traditional projections of Earth's surface onto flat projection screens invariably produce inaccurate artifacts or distortions. In the present system, such artifacts and distortions are reduced or eliminated.

FIG. 11 (d) illustrates a Mercator projection which exaggerates the size and distorts the shape of areas far from the equator 1121. For example, Greenland 1122 is represented as being roughly as large as South America 1123, when in fact the area of South America 1123 is actually approximately eight times that of Greenland 1122. Therefore, a spherical globe projection screen is a good and way to map the Earth's surface and to map similar substantially spherical bodies.

Figure 12:
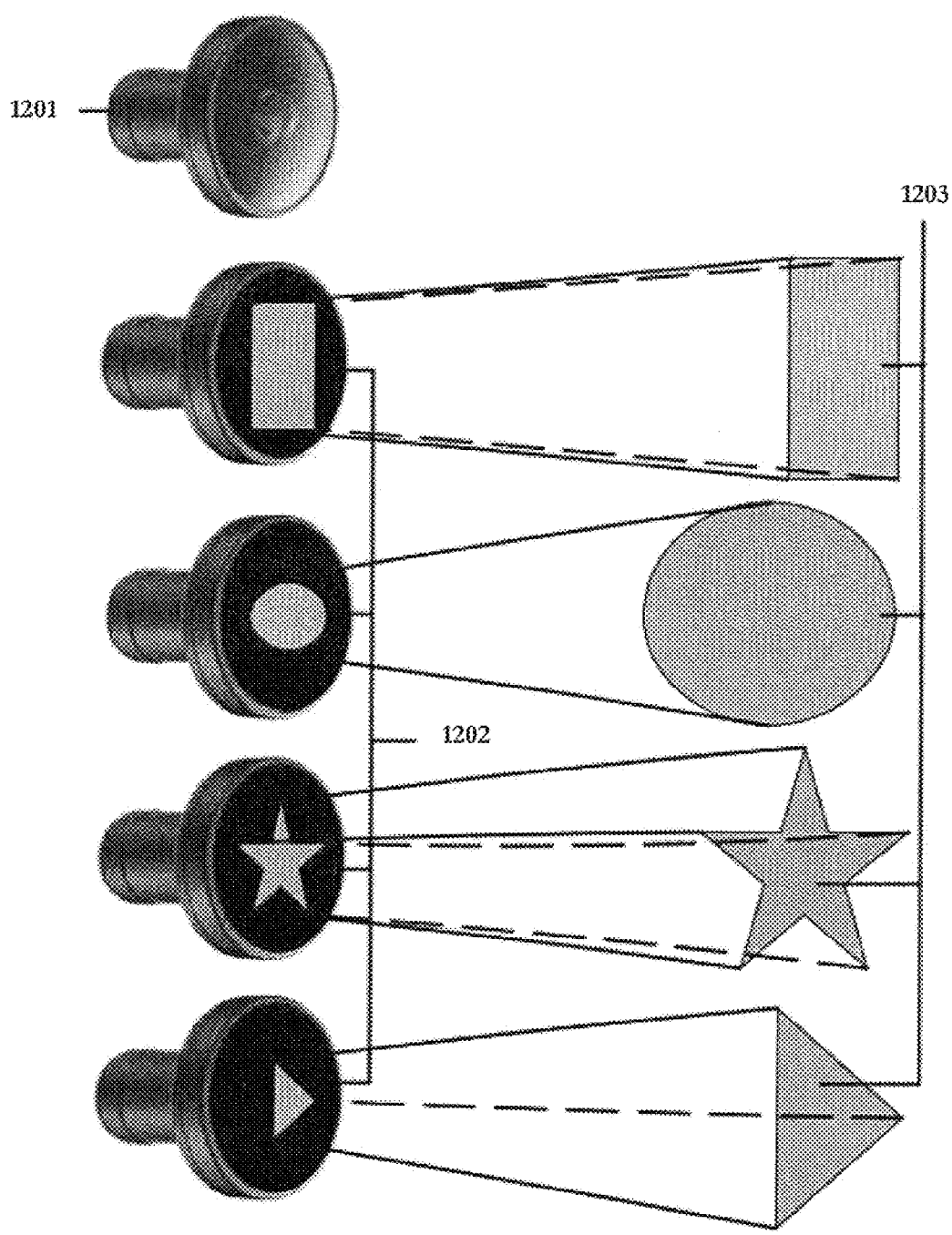
FIG. 12 illustrates several exemplary masks for use with a wide angle projection lens.

FIG. 12 illustrates how a projected image can be cropped by the use of filters or screens to achieve a desired output. The output of wide angle lens 1201 can be cropped by the use of a filter 1202 placed in line with the lens 1201. The filter 1202 blocks an undesired portion of light from exiting the lens 1201 allowing only the desired light waves 1203 to exit. This provides a shaped illuminated projection area, especially when used with coherent light images that suffer little diffraction at the edges of the blocking filter screens. A specific region of the projection surface can therefore be illuminated while others remain non-illuminated.

In some embodiments, it is desirable to provide the outer surface or the thickness of the projection screen with a colored or other textured look. For example, it may be pleasing or useful to imbue the projection screen or shell with a tint or hue. Also, it may be desirable to provide the projection screen with a thickness of some amount for aesthetic or utilitarian purposes. In some instances, a thick bluish tint may give a globe-shaped acrylic or glass projection shell the appearance of a planet's atmosphere.

Figure 13:
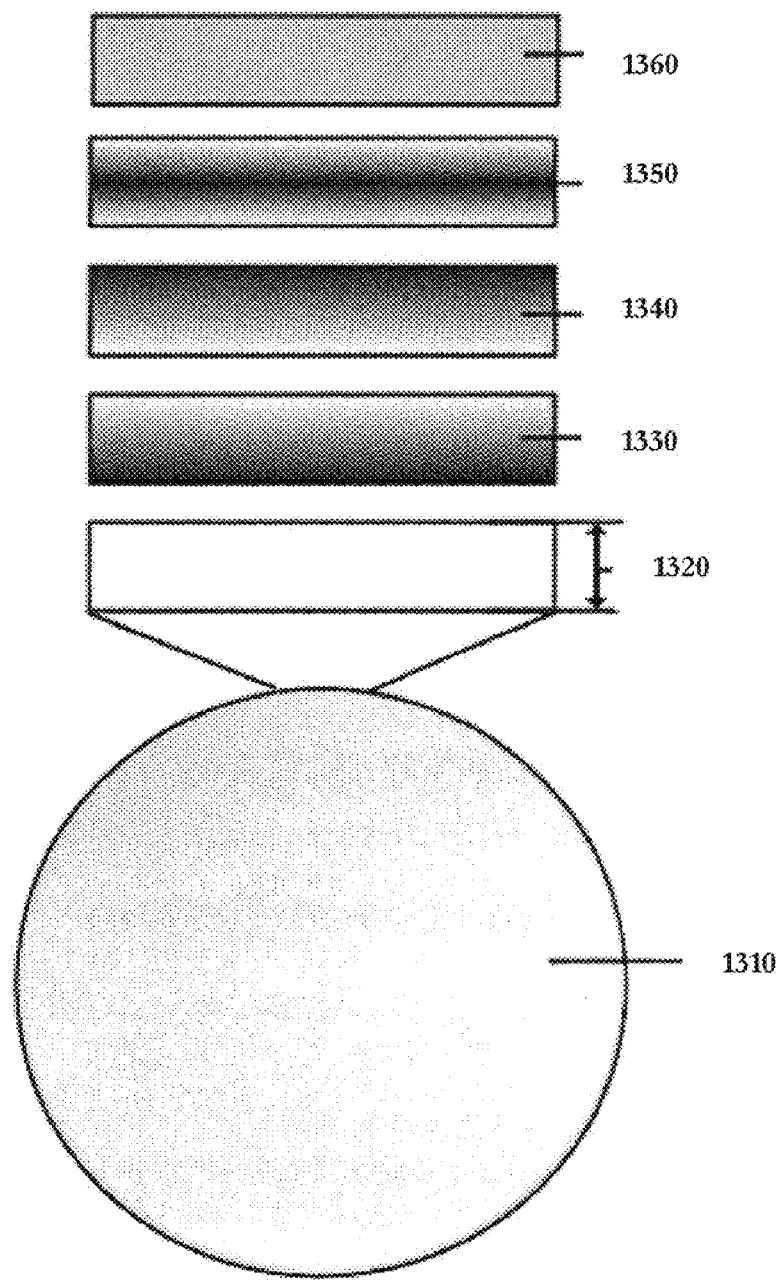
FIG. 13 illustrates a number of exemplary coating and tinting layers for use with the present projection surfaces.

FIG. 13 illustrates the use of a custom (e.g., bluish) tint within a projection surface to represent an atmosphere, ocean, skin, or another coating of a three dimensional object. A back-illuminated projection shell 1310 has its thickness 1320 roughly proportionally equal to the thickness of a desired portion of the Earth's atmosphere. The bluish tint may be mostly concentrated either on the inner surface 1330, the outer surface 1340, between the inner and outer surface 1350, or evenly throughout 1360, causing the desired effect.

Figure 14:
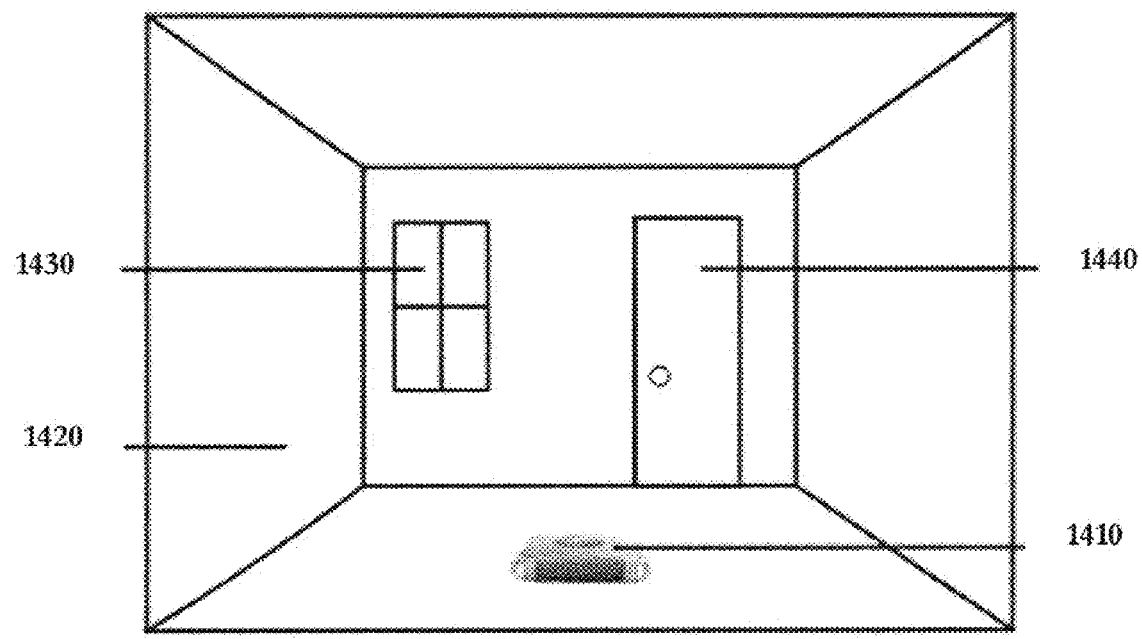
FIG. 14 illustrates the use of an exemplary projection system from within an enclosed space such as a room.
Figure 15:
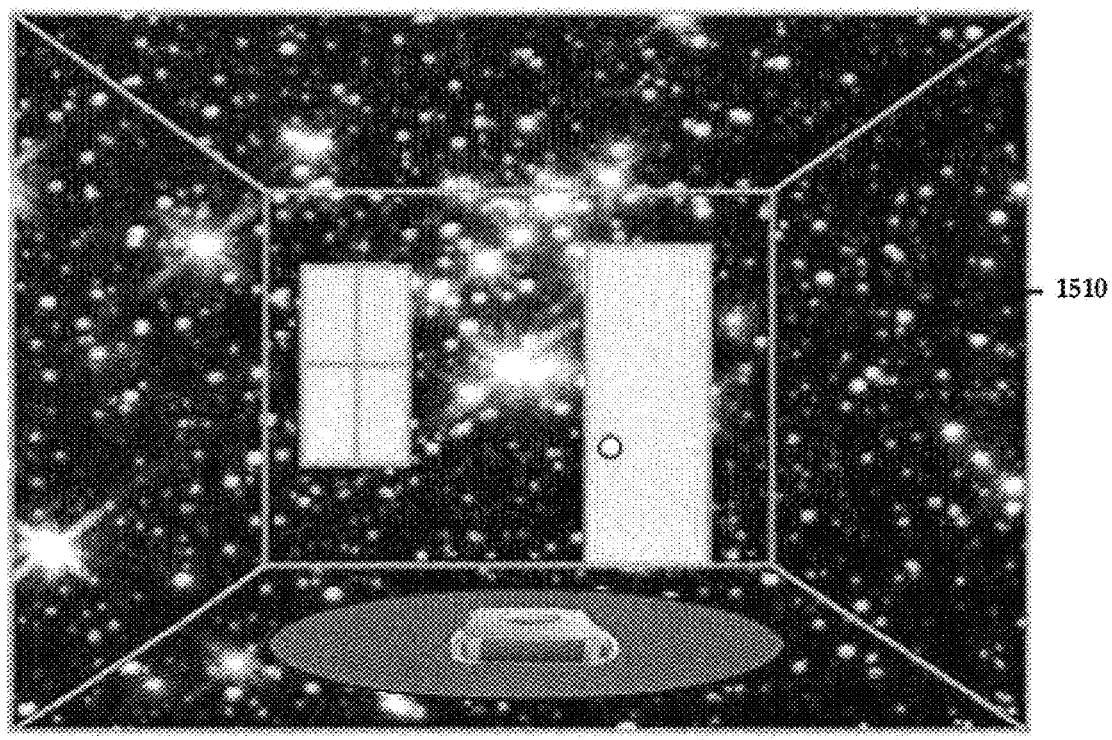
FIG. 15 illustrates the exemplary system of FIG. 14 in use with an image projected onto the interior surfaces of an enclosed space such as a room.
Figure 16:
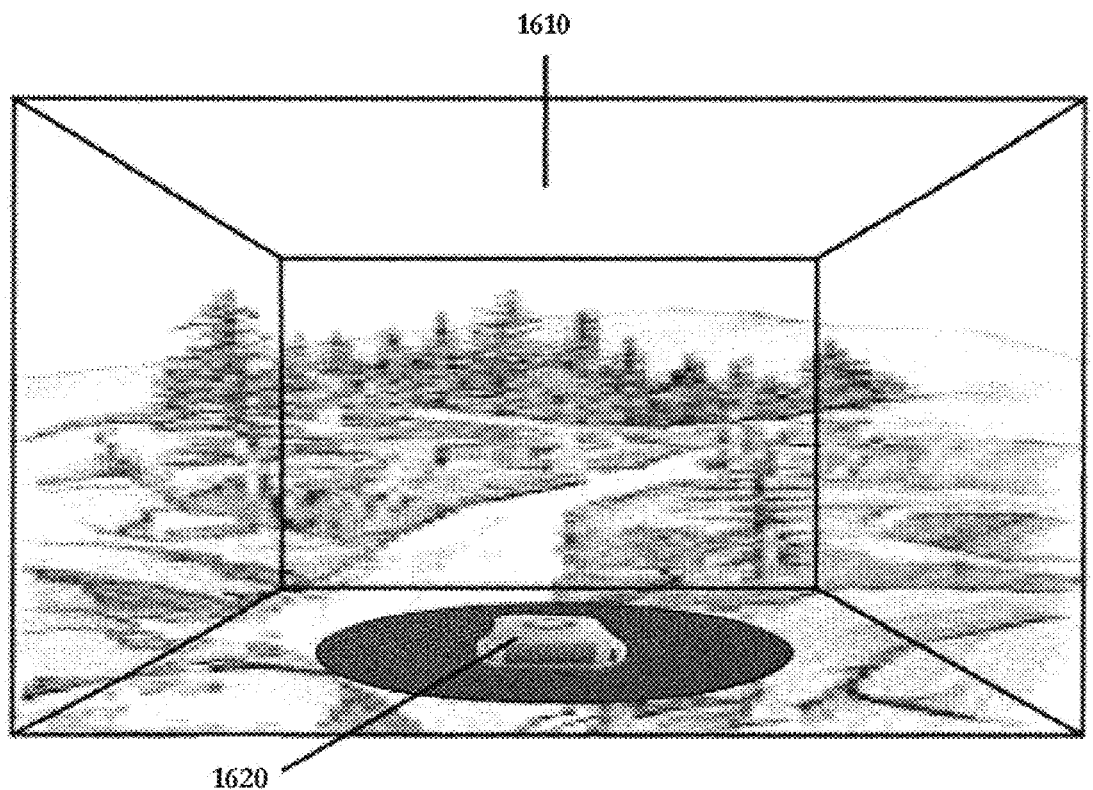
FIG. 16 illustrates another exemplary use of the system of FIG. 14.

FIGS. 14 through 16 illustrate how a system designed to project coherent light images onto the interior surface of a projection surface may be used as a personal planetarium or visual (e.g., virtual) environment, here with the viewing spectator being within the space of the planetarium as opposed to the cases above where the viewing spectator is positioned outside of the three-dimensional space. When system 1410 is placed into an enclosure or a room 1420 and is turned on, the system emits a focused coherent light image 1510 bathing the ceiling, walls, and in some cases a portion of the floor as well in coherent light. The use of blocking masks or filters explained in FIG. 12 can be customized to prohibit certain light rays from being projected onto the window 1430 and the doorway 1440, or other surfaces, including areas where an audience is seated to observe the show.

Numerous uses of the present system to illuminate and enhance the interior spaces of a home, theater, office, or other enclosure can be developed. For example, to experience something that a user cannot or does not want to experience in person is one possible type of application for the present system. Consider a person with a physical handicap who would like to experience the effect of walking through the woods, or a person who would like to simulate a car or bicycle race but isn't able to physically participate therein. The person may have previously-stored images (and optionally sounds) from the venue transmitted through the present projection systems onto the interior surfaces of a room the person is in so that the person can virtually enjoy the experience. Also, for scientific purposes, a person may experience the inside of a normally-inhospitable environment such as a cave or a volcano without being in physical danger. Cameras and optionally microphones may capture images and optionally sounds form an environment and bring that information to the projection system for presentation to a user. In some embodiments, the camera and optional microphone may be transmitting substantially real-time information from a remote location, such as the Tour de France bicycle race course, for example being mounted on one of the bicycles or vehicles at the race, and the user can experience that event almost in real-time. The same effect can be edited and time-delayed for broadcast in the way best suited for the application at hand. FIG. 16 illustrates how the present system is used to enhance a room's appearance and provide a virtual experience to a person inside the room. The image which is projected inside the room 1610 from the projector 1620 is a mountain scene.

Extensions of this concept to research experiments and video gaming experiences, optionally interactively conducted over a network with other players are contemplated by the present invention.

As discussed earlier, the present invention is capable of providing focused coherent light images onto a variety of three-dimensional projection surfaces. In some instances these projection surfaces have substantial curvature, depth, or even angular facets. This is distinct from present back-projection systems that project onto a substantially two-dimensional or flat (e.g., television, computer monitor) screen, and is distinct from projection onto the back of a slightly curved but otherwise two-dimensional cathode ray tube ("CRT") screen that has been in use for some time. These conventional (e.g., television, computer monitor) screens are not fully three-dimensional and cannot provide the same experiences as the presently-described projection surfaces. In the present invention, the highly-curved three-dimensional projection screens cover a spherical section with a substantial three-dimensional enclosed volume like a cup, dome, ball, and other such shells. Note that the shells are not necessarily hollow, but can in some embodiments include solid (filled) shapes that accomplish the same effect. In many present embodiments, the projection screen covers enough spherical section so as to provide greater than 180-degrees (hemispherical) solid angle projection. In yet some other embodiments, the coverage extends to at least 270-degree solid angle. In yet further embodiments, the coverage extends even to coverage exceeding about 300-degree solid angles.

Figure 17:
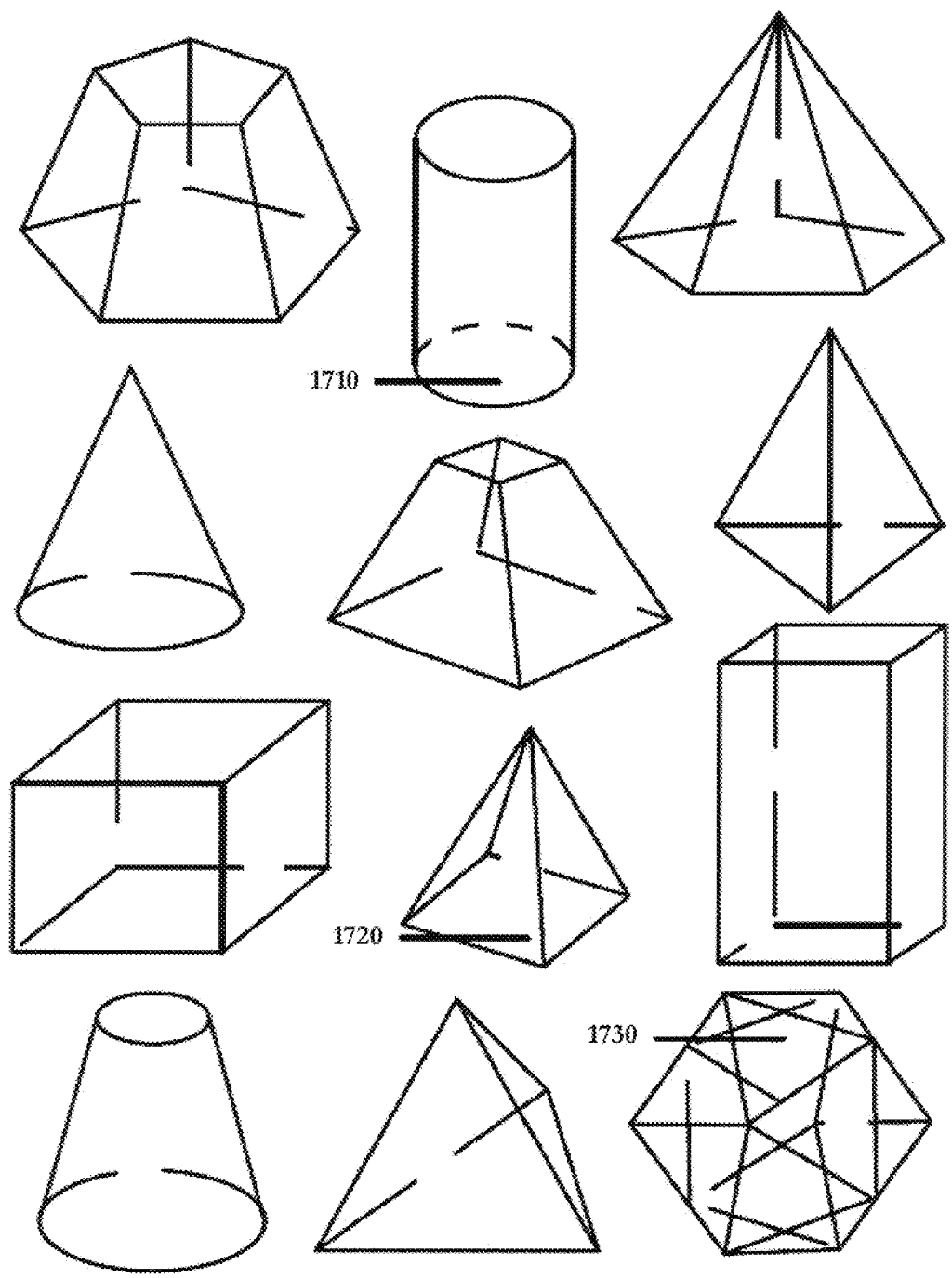
FIG. 17 illustrates a number of exemplary geometric three-dimensional projection surfaces.

FIG. 17 illustrates a number of exemplary but possible shapes of three-dimensional projection surfaces which can be used with the present invention. A three-dimensional projection shell can be fashioned for example, into a volumetric shape of a sphere, a cylinder 1710, a four-sided pyramid 1720, or an icosahedron 1730. These shapes are particularly useful when making polyhedral maps of various shapes. One can now imagine the use of such items for entertainment or educational purposes. Note that the range of three-dimensional projection surfaces is not limited to symmetrical or to geometrical bodies, but can be almost any arbitrary bounded volume or organic shape or physiological model that lends itself access to the projected coherent light rays described herein.

Figure 18:
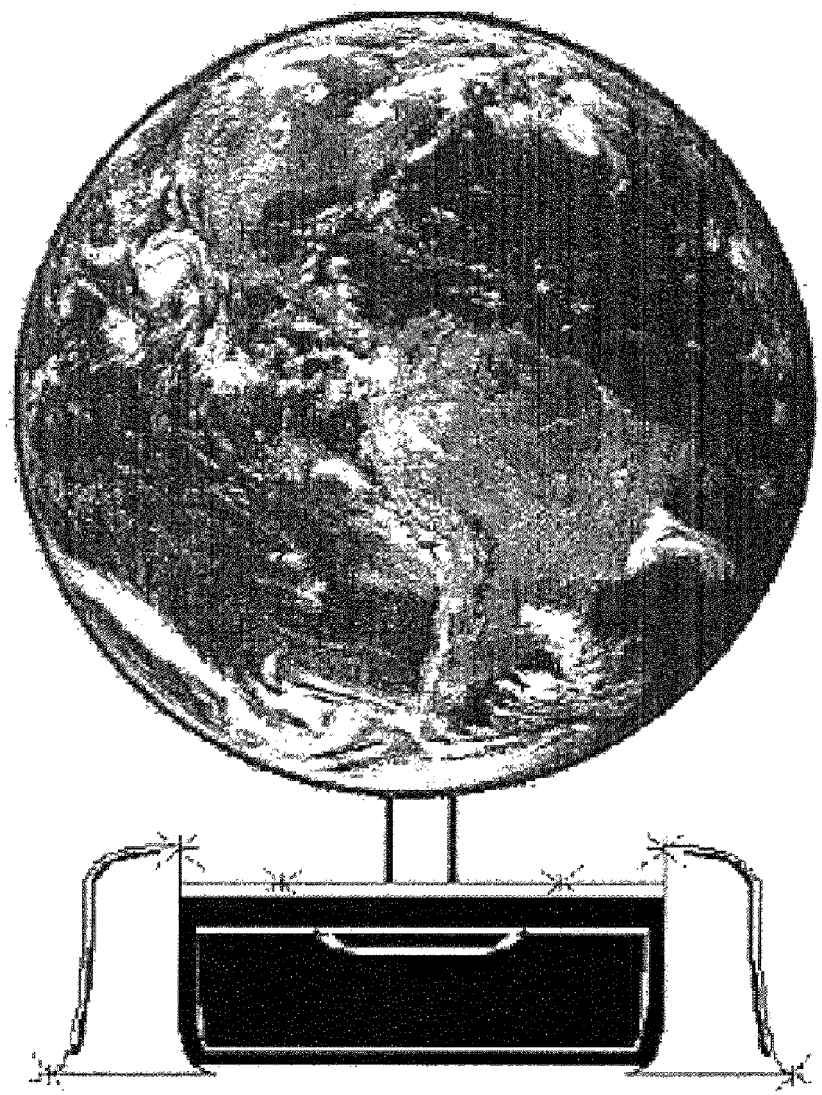
FIG. 18 illustrates a conceptual exemplary appearance of an image of Earth as it might appear on the projection surface for use herewith.

FIG. 18 illustrates how Earth might be projected onto the shell in embodiments of the present invention in a fashion that is much more realistic than conventional flat maps and is more informative and entertaining than static traditional "globe" maps painted onto a solid shell or sphere. The projection can provide information to a user for entertainment, utility, or educational purposes. This information can include weather, demographic, political, natural resources, wildlife, force fields, currents, economic, military, technological, medical, allergen levels, disease spreading, gradients, contours, or other natural or societal data relating to the globe on which we live. In addition, the information and images displayed can include illumination levels to depict the day and night passage with portions of the globe being illustrated as illuminated by sunlight and others being dark.

Figure 19:
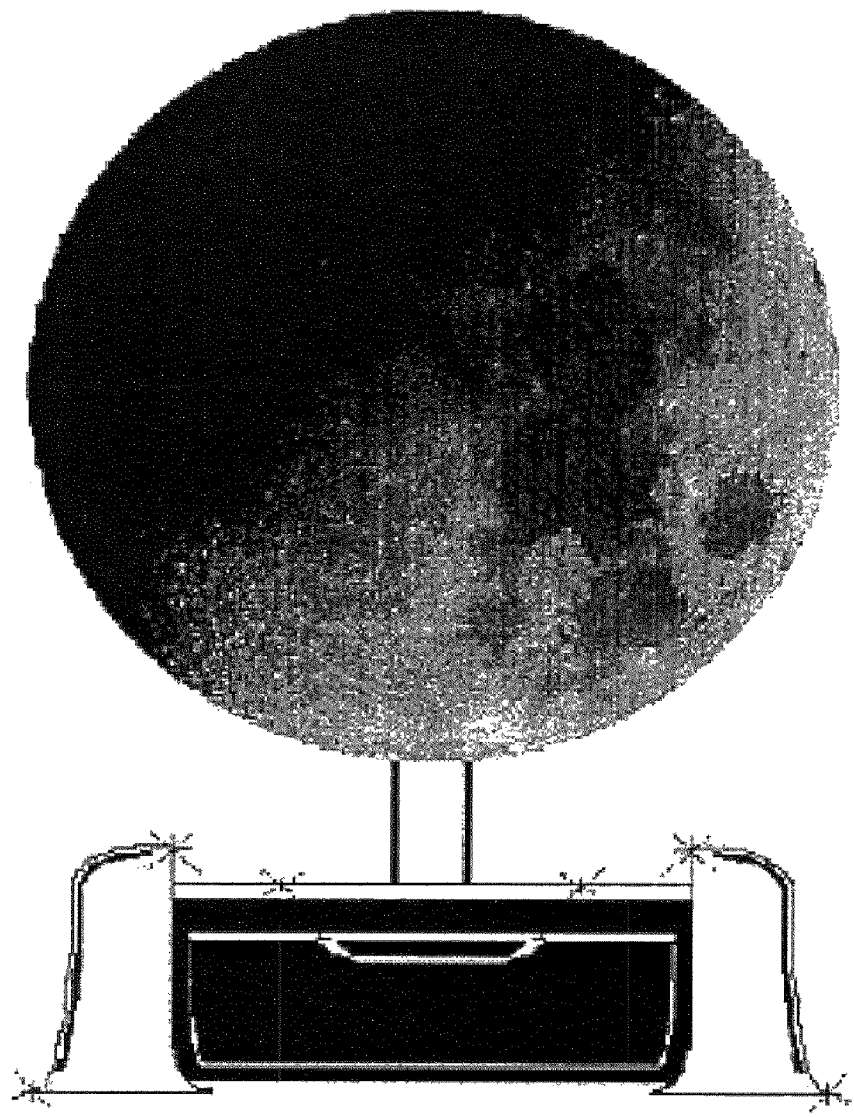
FIG. 19 illustrates a conceptual exemplary appearance of an image of the Moon as it might appear on the projection surface for use herewith.

FIG. 19 illustrates an exemplary projection of the surface of the moon, with lighting and darkening of areas to represent some condition of the celestial body in three dimensions as it would be under those conditions.

The shell used for back-projection herein can be a module that is replaced with other shells of other sizes and shapes where the application call for this. For example, a substantially spherical shell for projecting the Earth's surface can be replaced with a cubical shell or a shell depicting another three dimensional object. In some embodiments, the projection surfaces resemble actual or idealized anatomical parts such as the heart, brain, lungs, kidneys, etc. And static or dynamic moving images of the organ's behavior and structure can be projected onto an interior surface thereof. If required, computer-controlled image processing adjusts to accommodate the switching between one projection shell and another. Similar mechanical mating surfaces such as flanges or magnetic mounts can be used to universally couple the modular projection shells onto a common base. Educational units covering the solar system and later covering the human body can thus rely on the same projection system but just interchange the projection shells and projected imagery. Applications in architecture, surgery, and education are possible using this system as well.

Figure 20:
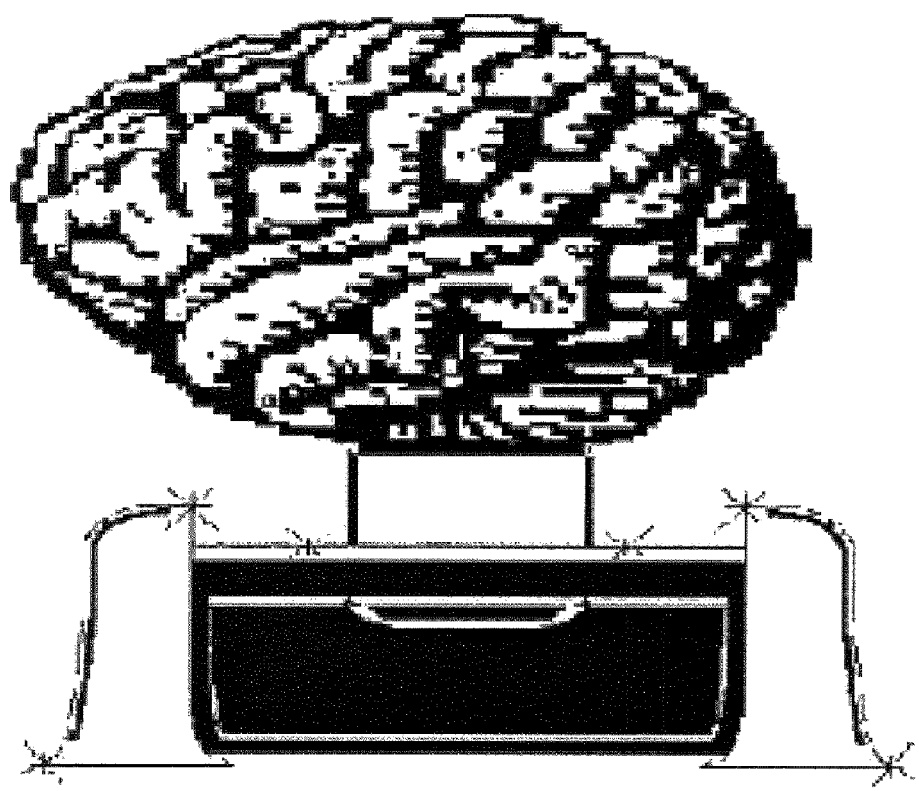
FIG. 20 illustrates a conceptual use of an anatomical (brain) shaped projection surface for use herewith.

FIG. 20 illustrates an exemplary concept for mounting a brain-shaped projection shell onto the projection system described herein. Note that the projection screens described herein can be coupled to the rest of the projection system in a variety of ways. There can be mechanical fasteners that include clips, screws, springs, barrel mounts, dowel pins, screw-on, and other mechanical couplings and fasteners used to secure the projection screen or shell to the underlying system. Also, magnetic coupling for attaching a projection screen can be used whereby the projection screen will accept a proper insertion into or mating with a corresponding surface or mount on a housing or similar element of the system. In the embodiments where the projection screens are intended to be changeable for repair or for displaying different objects, the coupling of the projection screen and the rest of the system can be made so that a user can remove one screen and attach another. In one example, a small globe can be alternately replaced with a larger globe. Both would provide a good focused image because the coherent light source is not affected by focal length or distance to the screen issues.

The present disclosure is not intended to be limited by its preferred embodiments, and other embodiments are also comprehended and within its scope. For example, embodiments where the contoured projection screen is not strictly spherical in shape, but rather cubical, rectangular, pyramidal, or otherwise shaped for utility or novelty purposes to support a projected image.

Numerous other embodiments, modifications and extensions to the present disclosure are intended to be covered by the scope of the present inventions as claimed below. This includes implementation details and features that would be apparent to those skilled in the art in the mechanical, logical or electronic implementation of the systems described herein. This also includes uses for such systems, whether for entertainment, education, commercial, military, astronomical, navigational, medical, or other purposes that the present systems are capable of being used in.

What is claimed is:

1. A projection system for projecting coherent images, comprising:
   a coherent light source configured to emit coherent light;
   a microdisplay array that receives the coherent light from said coherent light source and outputs a controlled coherent light output representing an image;
   an optical lens assembly that operates on said coherent light output of said microdisplay array and is configured to deliver a corresponding coherent light output representing an image to be incident upon a reflective surface of a variety of configurations without alteration of said optical lens assembly;
   said reflective surface having a three-dimensional configuration substantially defining an enclosure volume configured and arranged to receive the coherent light output from said optical lens assembly to present a corresponding viewable image that is observable from inside the enclosure volume without substantial loss of clarity of said viewable image.

2. The projection system of claim 1, said enclosure volume comprising varying distances and incident angles in respect to said optical lens assembly.

3. The projection system of claim 1, said optical lens assembly being capable of taking in hemispherical views.

4. An image projection system, comprising:
a coherent light source comprising a plurality of substantially mono-chromatic coherent light emitters, each designed to emit a different coherent light wavelength, and said coherent light source having one light emitter of each of said plurality of wavelengths;
a microdisplay array receiving said coherent light from said coherent light source and providing a computer-controllable coherent light output in each of said wavelengths;
an optical lens assembly that operates on the coherent light output of said microdisplay array, and is configured to deliver a corresponding coherent light output of each of said wavelengths for projection of a viewable image onto a reflective three-dimensional surface of a variety of configurations without alteration of said optical lens assembly, substantially without loss of clarity of said viewable image, wherein said three-dimensional surface substantially defines an enclosure volume around said optical lens assembly;
said optical lens assembly arranged and oriented to direct said coherent light output towards said reflective surface to cause a viewable image to be formed on said reflective surface that is observable from within said enclosure;
said optical lens assembly further arranged and oriented to direct said coherent light output to be simultaneously incident upon at least a 90-degree solid angle on said reflective surface.

5. The image projection system of claim 4, further comprising an in-line coherence adjustment element configured to adjust the coherence of said coherent light.

6. The image projection system of claim 4, said coherent light source comprising a VCSEL device.

7. The image projection system of claim 4, said coherent light source comprising a VECSEL device.

8. The image projection system of claim 4, said coherent light source comprising an eVCSEL device.

9. The image projection system of claim 4, said coherent light output representing a pre-distorted image configured to cancel a distortion effect of said optical lens assembly.

10. The image projection system of claim 4, said coherent light output representing a pre-distorted image configured to cancel a distortion effect of said enclosure volume geometry.

11. The image projection system of claim 4, further comprising a processor, said processor configured to control said microdisplay array to provide a controlled coherent light output representing an optical image.

12. The image projection system of claim 4, further comprising a user interface configured to allow a user to control said image presented by said viewable image.

13. The image projection system of claim 4, further comprising a storage element configured to store electronic data corresponding to viewable imagery projected by said system.

14. The image projection system of claim 4, said optical lens assembly comprising a wide angle lens.

15. The image projection system of claim 4, said optical lens assembly comprising an array of lenses.

16. The image projection system of claim 4, further comprising at least one blocking mask configured to prohibit projection of at least part of said corresponding coherent light output onto at least part of said reflective surface.

17. The image projection system of claim 4, further comprising at least one blocking mask configured to prohibit projection of at least part of said corresponding coherent light output onto said reflective surface when the corresponding area of said surface is transmissive.

18. The image projection system of claim 4, further comprising at least one blocking mask configured to prohibit projection of at least part of said corresponding coherent light output onto said reflective surface when an audience is located between said optical lens assembly and said reflective surface.

19. The image projection system of claim 13, said electronic data comprises at least one of sound files, image files and data files relating to the system.

20. The image projection system of claim 19, further comprising a wireless interface configured to provide said image projection system with said electronic data over a wireless medium.

21. The image projection system of claim 19, further comprising at least one audio speaker.

22. The image projection system of claim 20, said wireless interface is coupled to a data network.

23. The image projection system of claim 22, said data network being coupled to the Internet.

24. The image projection system of claim 21, further comprising a user interface confirmed to allow a user to control the sound produced by said at least one audio speaker.

25. The image projection system of claim 14, said wide angle lens providing an optical output covering a solid angle between about 90- to 120-degrees about a central axis.

26. The image projection system of claim 14, said wide angle lens providing an optical output covering a solid angle between about 120- to 180-degrees about a central axis.

27. The image projection system of claim 14, said wide angle lens providing an optical output covering a solid angle greater than 180-degrees about a central axis.

28. A method for projecting an image onto an internal surface of a substantially-enclosed three dimensional surface, comprising:
generating coherent light in a visible portion of the electromagnetic spectrum from a coherent light source;
providing said coherent light as an input to a microdisplay apparatus;
controlling said microdisplay apparatus to output a coherent light representation of the image;
providing said output of said microdisplay apparatus as a coherent light input to an optical lens assembly; and
altering the coherent light input of the optical lens assembly within the optical lens assembly, including projecting a coherent light output from said optical lens assembly outward from the optical lens assembly to cover a substantial solid angle of said three dimensional reflective surface of a variety of configurations without alteration of said optical lens assembly to form a clear and viewable image upon said reflective surface without substantial loss of clarity of said viewable image.

29. The method of claim 28, said projecting the coherent light comprising scanning a laser light beam across a substantial solid angle of said reflective surface to raster-draw said visible image across said substantial solid angle.

30. The method of claim 28, said projecting the coherent light comprising simultaneously projecting said coherent light onto a plurality of locations on said reflective surface to draw said visible image across said substantial solid angle.

31. The method of claim 28, said substantial solid angle comprising at least 90-degrees about a central axis.

32. The method of claim 28, said substantial solid angle comprising at least 180-degrees about a central axis.

33. The method of claim 28, said substantial solid angle comprising greater than 180-degrees about a central axis.

* * * * *